INPUT-OUTPUT DATA SERVICE COMPUTER

Filed Nov. 26, 1965 24 Sheets-Sheet 1

INVENTORS.
RICHARD E. BRADLEY
ALBERT SANKIN
GEORGE H. BARNES
S. PETER BEAUREGARD
JAMES L. MURTAUGH
HERBERT L. ROSENBLATT
BLAIR C. THOMPSON

George L. Kensinger
ATTORNEY

INVENTORS.
RICHARD E. BRADLEY
ALBERT SANKIN
GEORGE H. BARNES
S. PETER BEAUREGARD
JAMES L. MURTAUGH
HERBERT L. ROSENBLATT
BLAIR C. THOMPSON

BY George L. Kensinger
ATTORNEY

INPUT-OUTPUT DATA SERVICE COMPUTER

INVENTORS.
RICHARD E. BRADLEY
ALBERT SANKIN
GEORGE H. BARNES
S. PETER BEAUREGARD
JAMES L. MURTAUGH
HERBERT L. ROSENBLATT
BLAIR C. THOMPSON

George L. Kensinger
ATTORNEY

Oct. 15, 1968 R. E. BRADLEY ET AL 3,406,380

INPUT-OUTPUT DATA SERVICE COMPUTER

Filed Nov. 26, 1965 24 Sheets-Sheet 8

Oct. 15, 1968 R. E. BRADLEY ET AL 3,406,380

INPUT-OUTPUT DATA SERVICE COMPUTER

Filed Nov. 26, 1965 24 Sheets-Sheet 18

Oct. 15, 1968 R. E. BRADLEY ET AL 3,406,380

INPUT-OUTPUT DATA SERVICE COMPUTER

Filed Nov. 26, 1965

24 Sheets-Sheet 22

United States Patent Office 3,406,380
Patented Oct. 15, 1968

3,406,380

INPUT-OUTPUT DATA SERVICE COMPUTER

Richard E. Bradley, Wayne, Albert Sankin, King of Prussia, George H. Barnes, West Chester, Simon Peter Beauregard, Malvern, James L. Murtaugh, West Chester, Herbert L. Rosenblatt, Broomall, and Blair C. Thompson, King of Prussia, Pa., assignors to Burroughs Corporation, Detroit, Mich., a corporation of Michigan Filed Nov. 26, 1965, Ser. No. 509,909
20 Claims. (Cl. 340—172.5)

ABSTRACT OF THE DISCLOSURE

Input-output data service computing apparatus connected in an electronic data processing system including a central processor, a main memory and a plurality of input/output channels. The data service computing apparatus includes a local memory for storing input/output channel controls, a processing unit for constructing information transfer control words, and a data transfer control unit coupled to the input/output channels and to the system main memory.

This invention relates to electronic data processing and more particularly relates to the control of input and output devices which are incorporated in electronic data processing systems.

In the operation of electronic data processing systems it is usual for the overall speed of operation of the system to be limited or restricted by relatively slow speed input and output devices connected in the system. This limitation upon system speed has remained despite the use of input and output control units and the use of such techniques as multiplexing of information transfer and scanning of input and output devices requiring service.

The actual computation performed by central processors has customarily been the most rapidly performed operation in data processing systems. The cycle of operation of memory systems, though in the past relatively slow in comparison to arithmetic computation, has been shortened considerably by the development of much higher speed memories such as thin film arrays, tunnel diode and cryogenic memory devices. Even the programming of electronic data processing systems has been improved to enable more rapid programming of systems by the use of machine-oriented programming language and the use of program compilers. It has, therefore, become increasingly desirable to increase the speed of information transfer into and out of system memories and to increase the independence of operation of input and output information transfers to permit central processors to utilize a higher portion of the time available for performance of computations.

Independent operation of input and output information transfers is desired to free central processors from direct step-by-step control of input and output transfer operations—the so-called bookkeeping operations—so that the central processor can utilize more of the time available for performing computations near its maximum rate of operation. In a modular data processing system such as that described in Lynch et al. Ser. No. 313,591, now Patent No. 3,302,182, filed Oct. 3, 1963, and entitled "A Store and Forward Message Switching System Utilizing a Modular Data Processor," independent operation of input and output transfer operations is desirable to also permit fully independent operation of the central processor modules with the memory modules.

To improve the speed and independence of input and output information transfers, some past data processing systems have incorporated general purpose computers as satellites to attend to and direct the input and output operations and have used buffering devices between the input and output devices and the satellite computer for increasing the rate of information transfer thereto. The use of such satellite computers for input and output control, however, has not eliminated the restrictions placed on system operating speed and efficiency by the demands of the input and output devices since central processor attention and direction to the input and output operations was still necessary for providing step-by-step control into the satellite's memory.

The buffers connected between input and output devices and the satellite computers were also inefficient since the input and output transfers were buffered to equal size words or characters of information, thus requiring more frequent service of some devices than others. The nature of these general purpose satellite computers also limited their usefulness for incorporation into modular data processing systems since central processor time would be necessary for developing and causing delivery of sets of transfer instructions directly into the general purpose satellite computer's memory for directing the satellite computer's control of input and output information transfers.

Accordingly, it is an object of the subject invention to provide a highly programmable on-line input-output data service computer for controlling information transfers between input and output devices and a central memory via a magnetic disc file if desired, without continual direct control or instruction by a central processor.

Another object of the subject invention is to free to a greater degree than does prior art input-output controllers the central processor in electronic data processing systems from step-by-step control of input and output information transfers and thereby enable a greater rate and efficiency of computations by the central processor.

A further object of the invention is to deliver and accept different size bytes of information to and from input and output devices rather than buffering each input and output transfer in equal size words and thus permit the approach to equal frequency of service of each input and output device.

A still further object of the subject invention is to store input-output channel controls in the local memory of an input-output computer to enable the computer to directly access program instructions stored in a main system memory for constructing channel descriptors for use in directing the performance of information transfers.

In accordance with the above-stated objects, there is provided an input-output data service computer comprising a processor unit for executing externally stored input-output program instructions to construct channel descriptors; a data service unit for servicing input and output channels in order of priority and controlling information transfer in accordance with the channel descriptors; a local memory unit connected to the processor unit and the data service unit for storing a channel control for each input and output channel, comprising instruction addressing information and a channel descriptor; and a communication unit connected to the processor unit and the data service unit for effecting transfer of data and instructions to and from an external storage means. The channel controls comprise instruction and parameter base address information, space for the storage of data bytes, and channel descriptors which comprise information regarding the byte length and byte position within a data word, number of bytes to be transferred, the external address to be used in the transfer, controls, and input or output device status information.

In accordance with the invention there is provided an input-output data service unit for scanning input and output channels in order of priority and controlling information transfer in varying size bytes and number of bytes with a memory in accordance with unique channel descriptors available for each input and output channel. There is also provided by this invention an input-output processor unit capable of addressing and executing externally stored instructions under system program control for sequential on-demand construction of channel descriptors for use in the control of input and output information transfers. The input-output processor unit further includes operand field discrimination means for controlling the field to be operated upon in modifying channel control instruction and parameter address information and for constructing channel descriptors for the control of information transfers.

A feature of this invention resides in the capability of the input-output data service computer to directly access program instructions and parameters stored in an external main memory in accordance with the state word address containing portion of the channel controls which are stored within its local memory. Each channel state word in local memory comprises an instruction base address, a parameter base address, an instruction counter, and index registers for use by the input-output processor unit in addressing main memory locations. Main memory address locations can thus be directly addressed for obtaining instruction steps and parameters or operands for use in constructing channel descriptors. This local memory-to-main memory addressing technique for accessing instructions and parameters stored in main memory locations is completely under the control of the input-output data service computer and does not interfere with the operation of the central processor in any system in which it is used, nor does it require continual direction or control by the system central processor for obtaining instructions. An important feature of the separate storage of instructions and parameters in main memory is that the input-output processor unit can utilize a given program set of instructions or program routine for constructing different input-output channel controls. Each channel may have assigned to it a unique set of parameters for use in the execution of these universally available program routines.

Another feature of the subject invention is the capability of the input-output data service computer to process fully jobs assigned to it by a system executive scheduling program which may include a number of program routines. Each new job provides the input-output processing unit with a new state word for one of its channel controls which identifies a program to be processed and supplies parameters for use in executing the program instructions. Once the input-output computer begins executing the program identified by a job, it will construct a descriptor in the processing unit, perform the transfer described by the descriptor, and return each time to the job program for instructions for constructing new descriptors until the entire input-output job is completely performed. An important feature of the invention is that while the data service unit is implementing a descriptor for a channel, the processing unit will continue to serve other channels by re-entering the programs in main memory identified by the jobs for each channel for constructing new descriptors therefor as needed.

A further feature of the subject invention is its capability to be utilized in combination in a data processing system having a main memory such that data transfers between various input and output devices, as well as transfers between input and output devices and main memory, can be effected without any intervention by, or interruption of, the central processor. In particular, transfers between the disc file (or magnetic drum) and other input and output devices can be so effected. For example, information coming from an input device, such as a card reader, can be assembled on the disc until detection of an indication that the assembled information is complete, whereupon the input-output processor will return to the disc channel program for another task. This task may well be that of taking the information once assembled on the disc and transferring it in a block to main memory. In such device-to-device transfers, a buffer area in the main memory is assigned to the input or output channel involved.

In the case of a transfer from an input device to disc file, and subsequently to main memory, the sequence of information transfer is as follows: Under control of a descriptor the input-output data service unit receives data words or bytes from the inputting device when it has priority, accumulates the data if necessary, and transfers data words to the main memory buffer location designated by the address field of the descriptor. Then, under control of a main memory buffer-to-disc file descriptor, the input-output data service unit delivers to the disc file controller a disc file address and main memory buffer address and indicates whether an input or output transfer is to occur. The data service unit then transfers the data from main memory buffer area to disc file. The sequence is repeated until all the incoming information is accumulated in the disc file. Upon completion of the disc file transfers, which may be ascertained by counting the extent of the accumulated information or by examining the incoming data, or may be indicated by the programs for this channel of the data service computer, or by a signal received from the input peripheral device, all relevant channels return to their program and parameter areas in main memory for further tasks which may have been placed there by the executive program. In the case of the present example, the disc channel may find instructions to transfer the assembled data to a specific main memory address. The transfer of information in the reverse direction to an output device, either from disc file, or from main memory via disc file, follows a similar procedure but in reverse order.

A further feature of the input-output data service computer is its capability to successively access input-output jobs stored in a main memory to be performed by the input-output channels after the channels have completed previously assigned jobs. Upon obtaining a job from a job stack stored in main memory, the input-output processor unit acquires a new state word bearing parameter and program instruction addressing information and stores the same in the local memory unit. This access of and response to input-output jobs stored in an external memory is completely independent of central processor interference and is completely under control of the input-output data service computer, requiring no interference with a central processor. The input-output jobs may refer to transfers between input or output devices and main memory or may direct data transfers between input and output devices themselves, each of which may include intermediate transfers which themselves may comprise several steps in the information tranfer specified.

Further objects and features of the invention will be described in the following detailed description to be read in conjunction with the accompanying drawings wherein.

Figures 3, 3A:
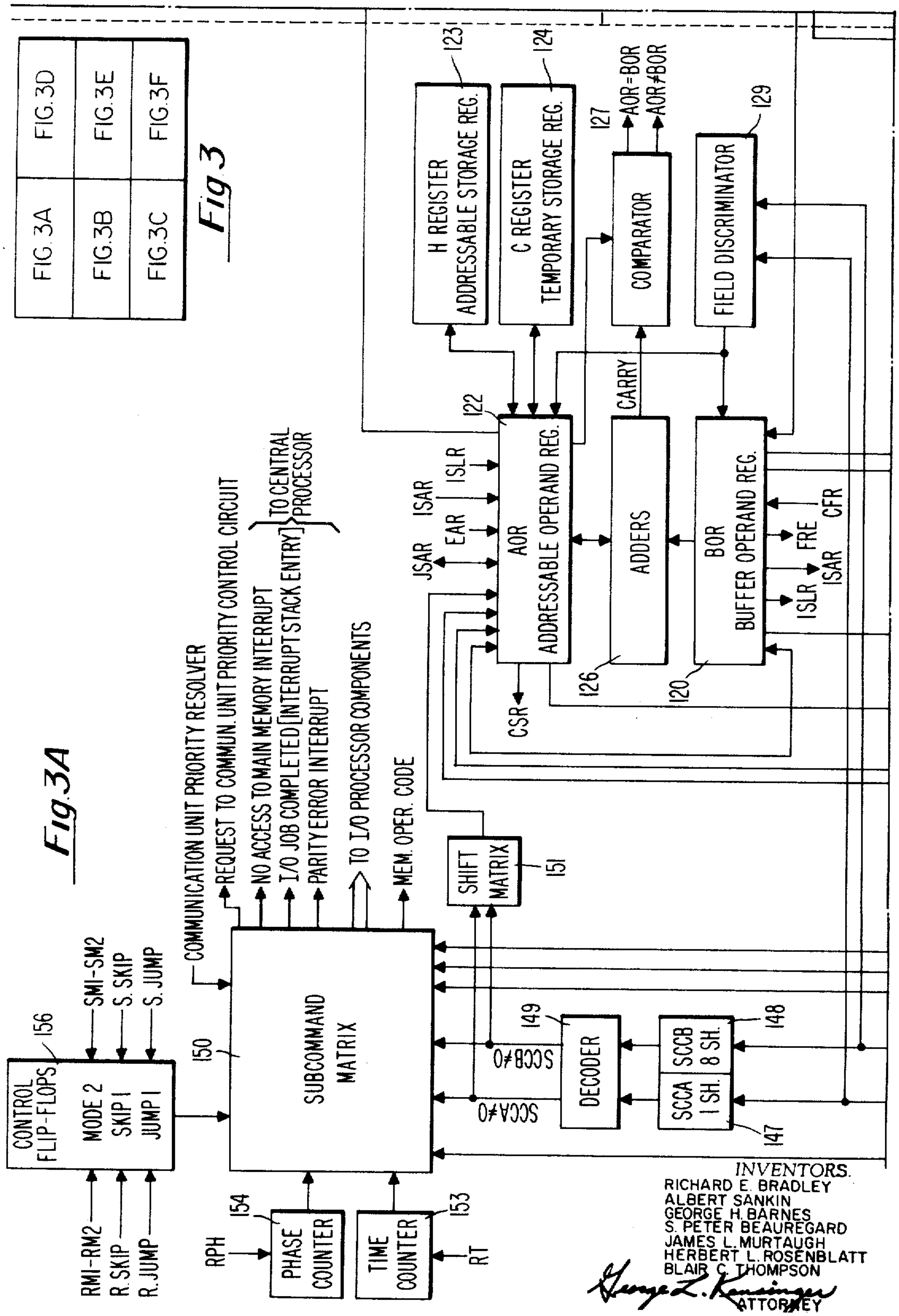
Figure 3B:
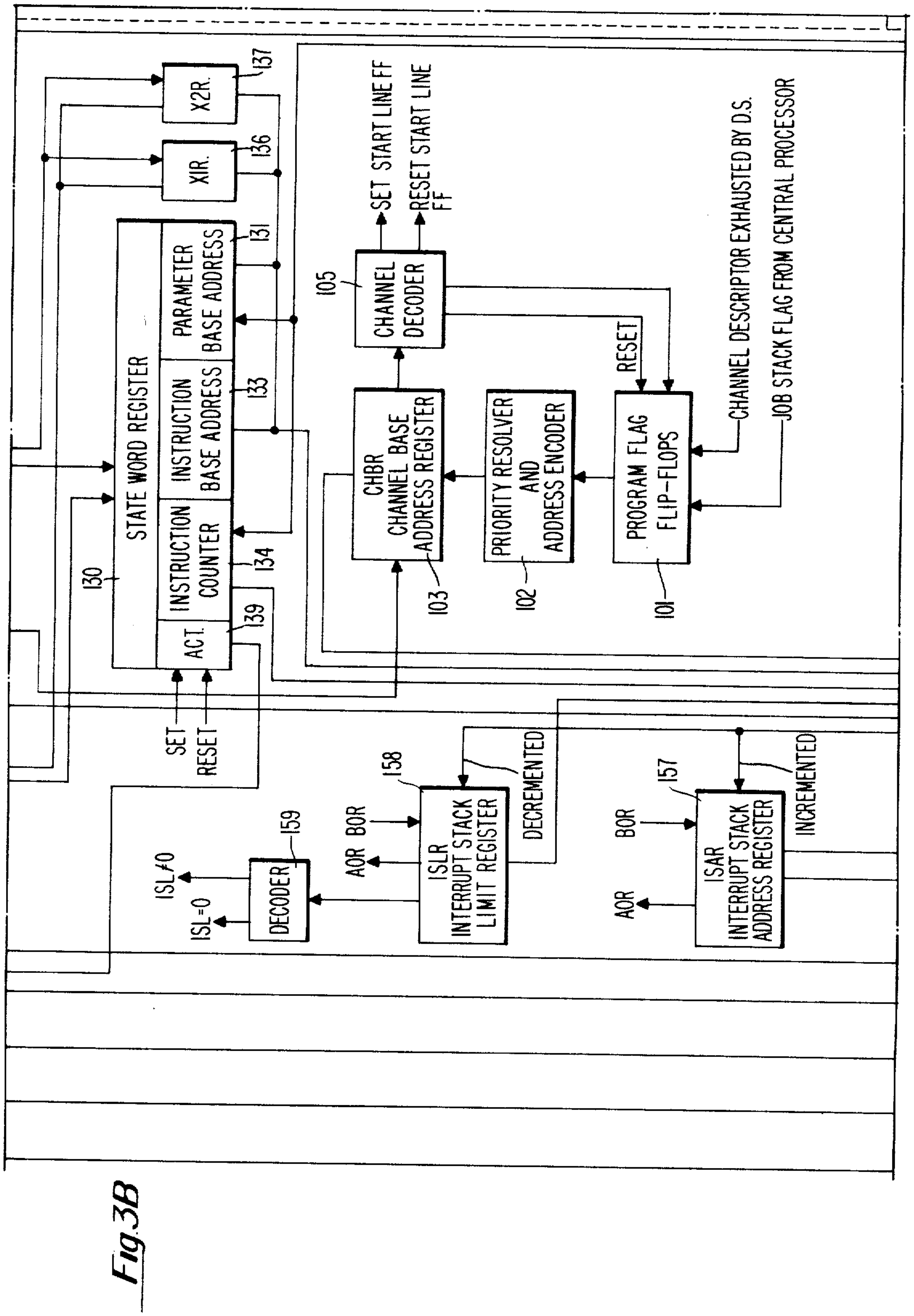
Figure 3C:
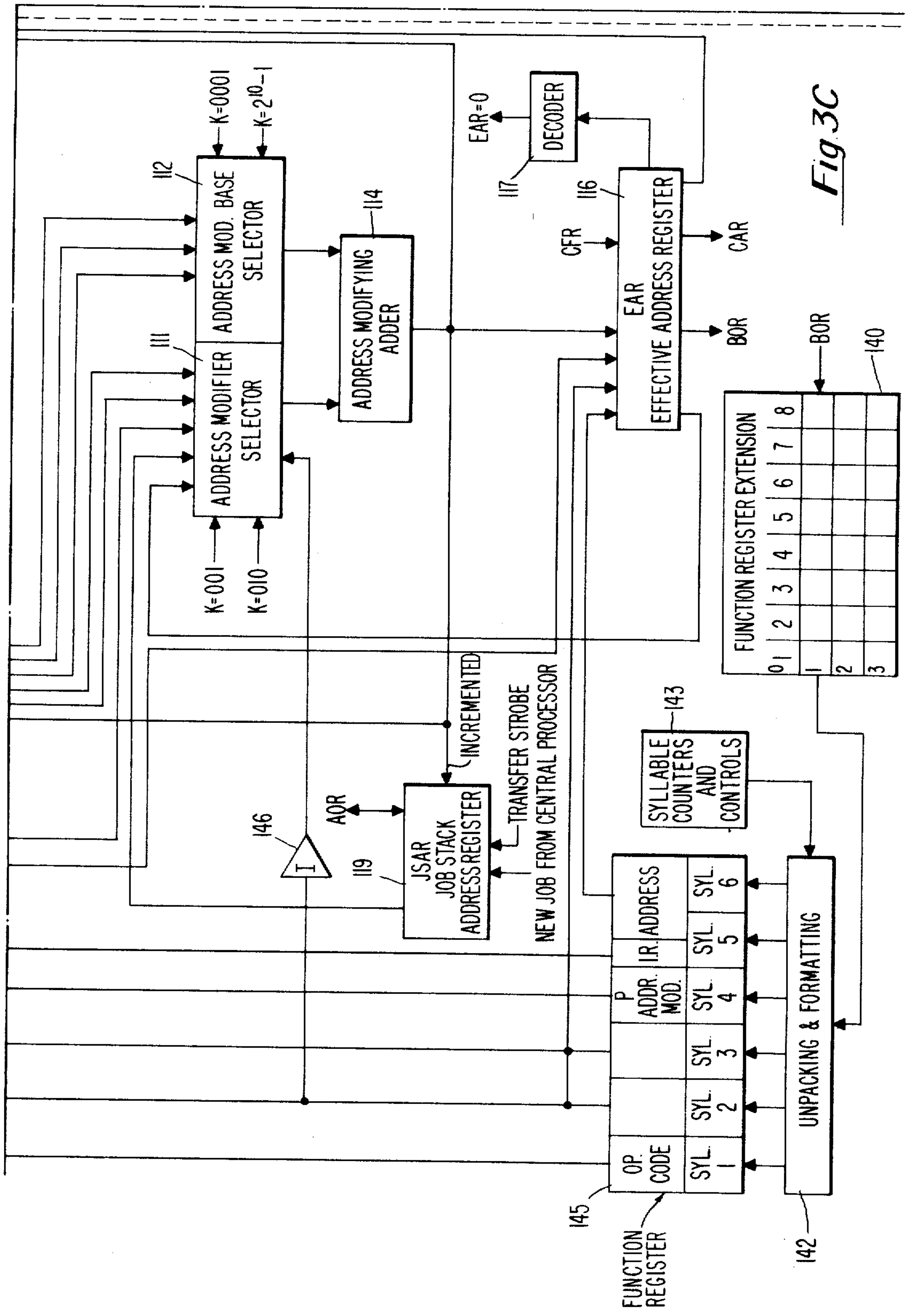
Figure 3D:
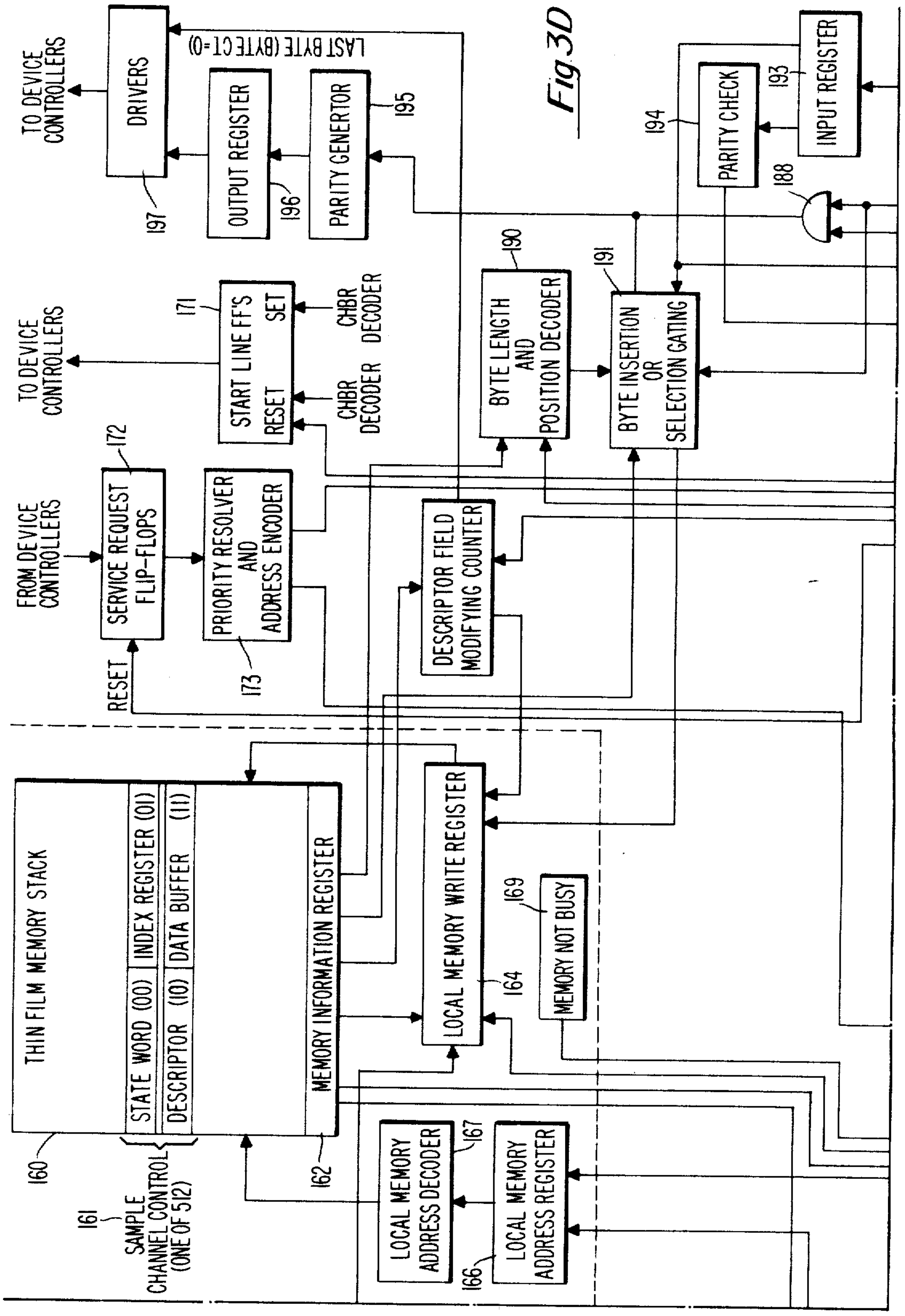
Figure 3E:
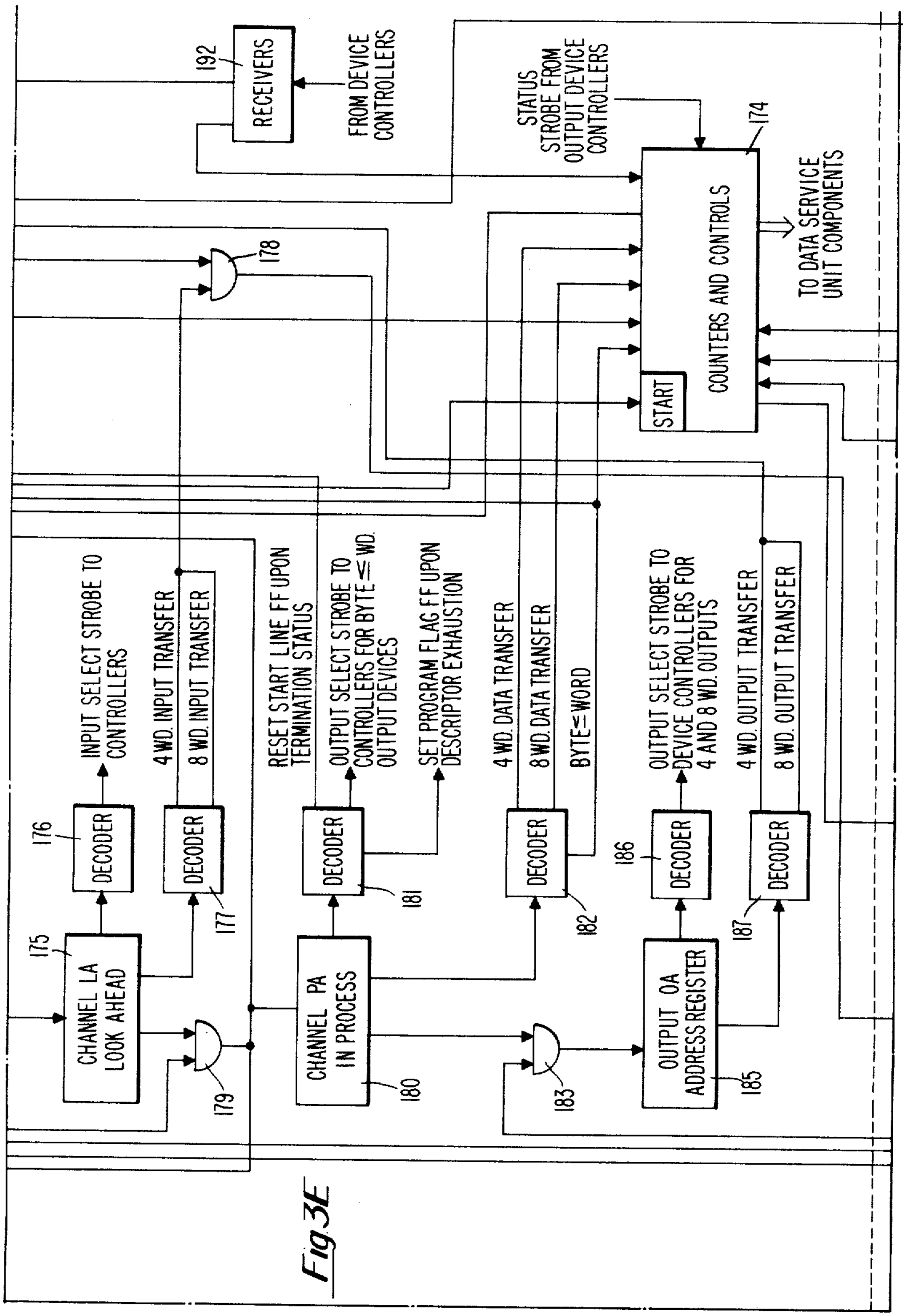
Figure 3F:
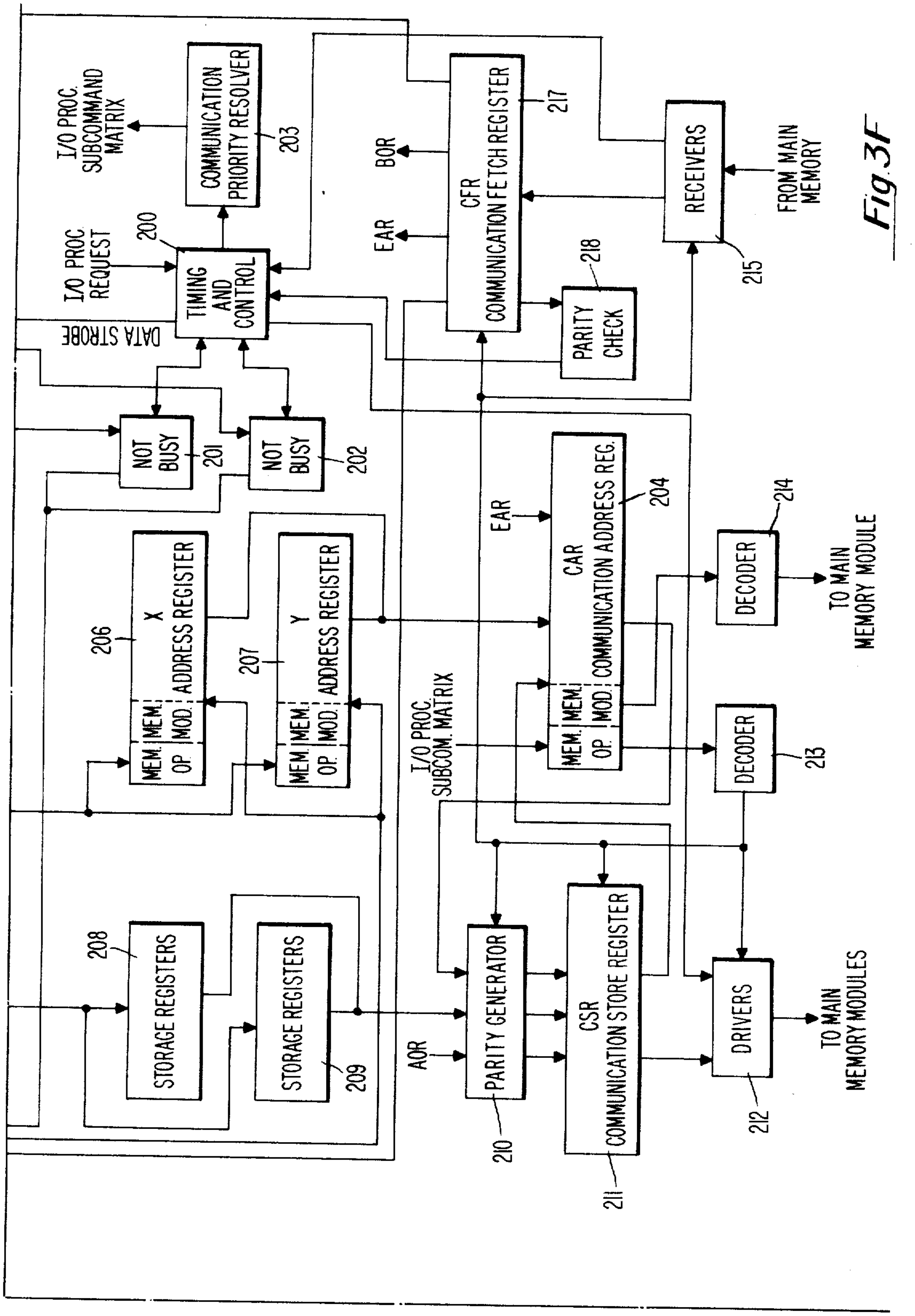
Figure 4:
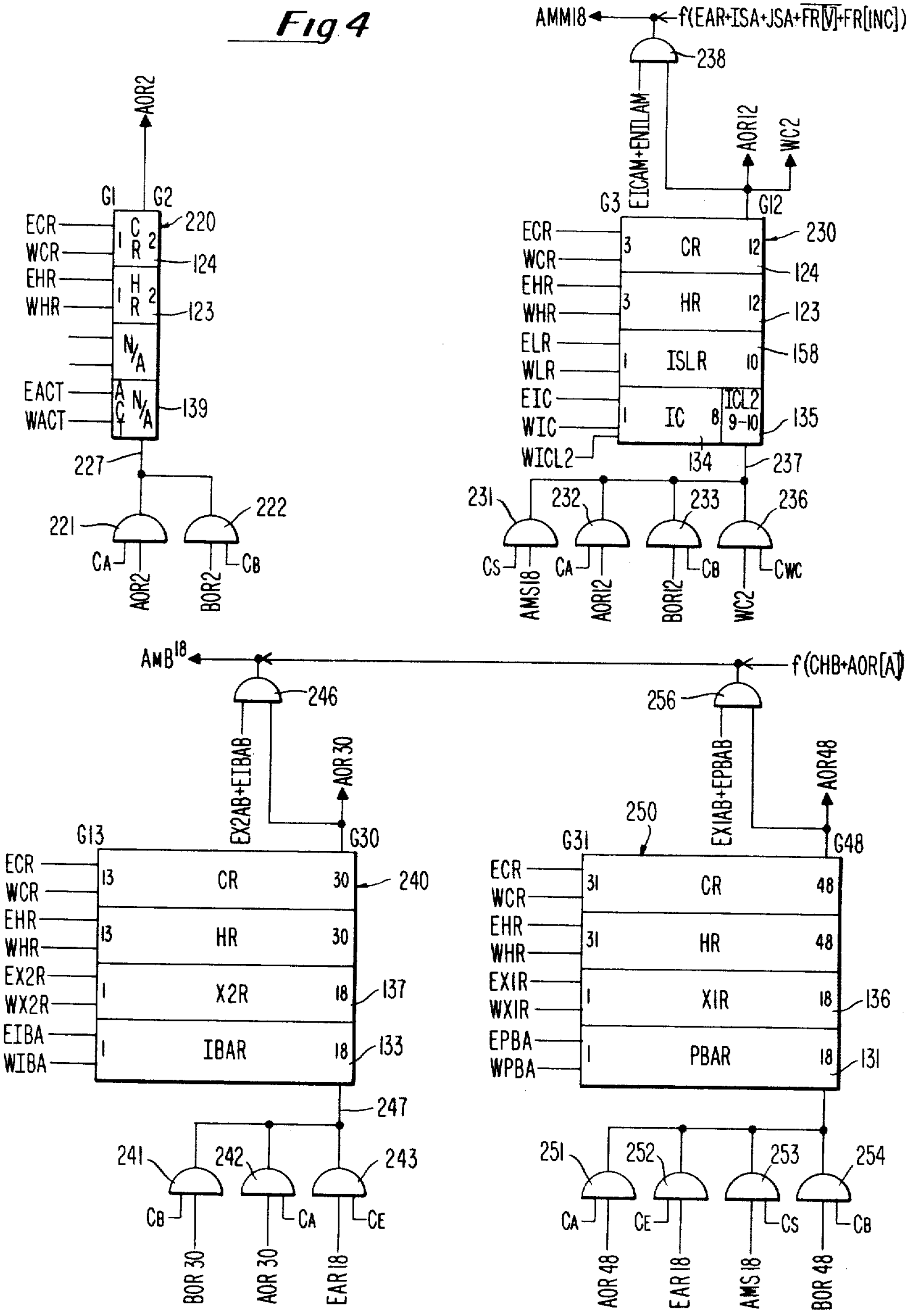
Figure 5A:
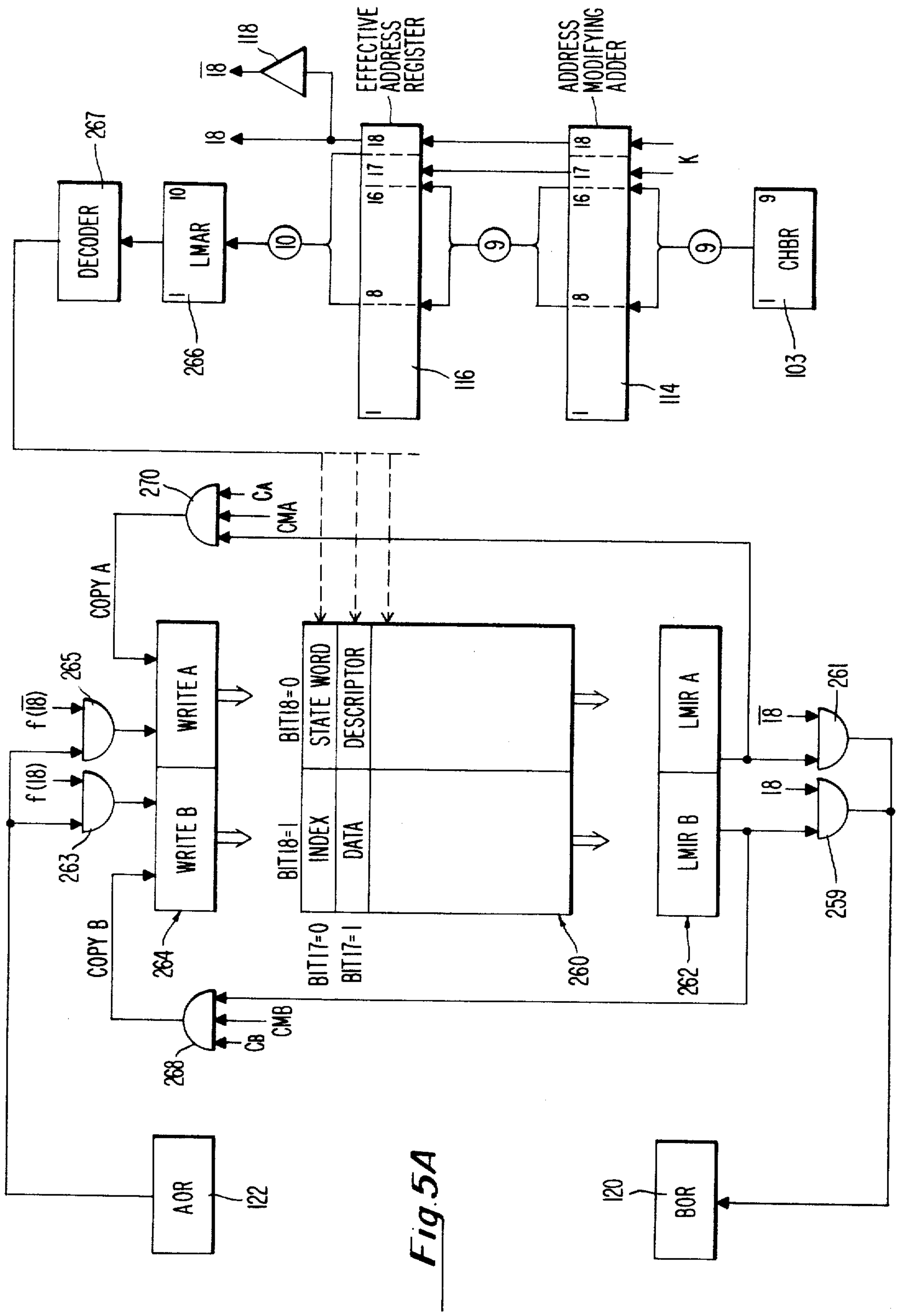
Figure 5B:
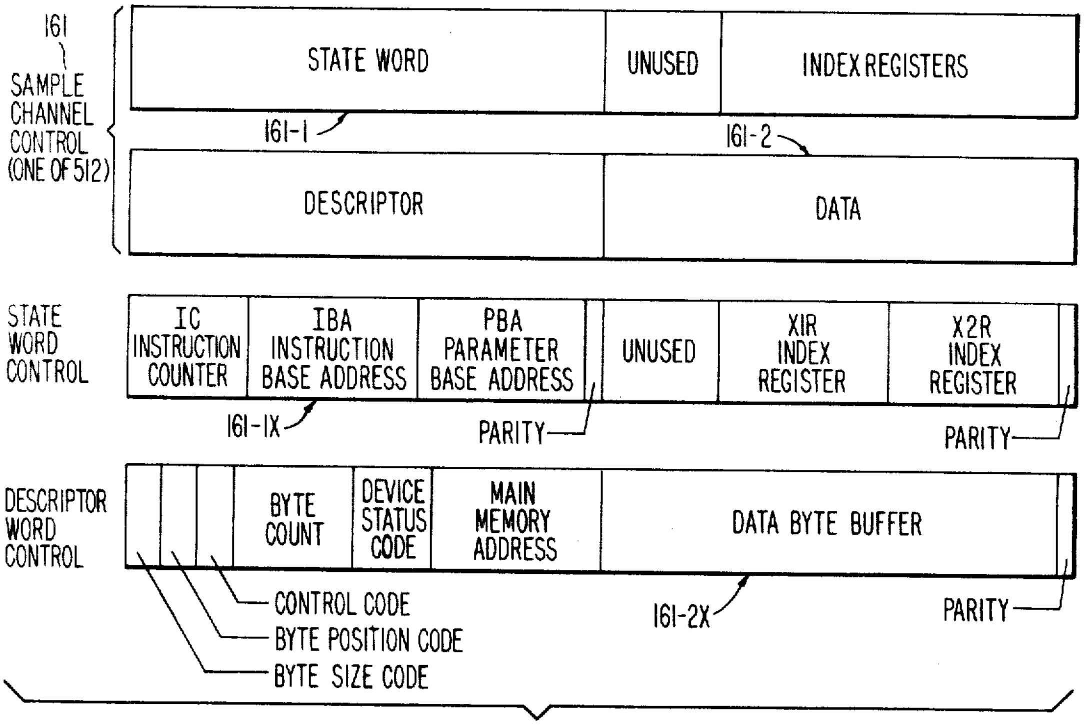
Figure 5C:
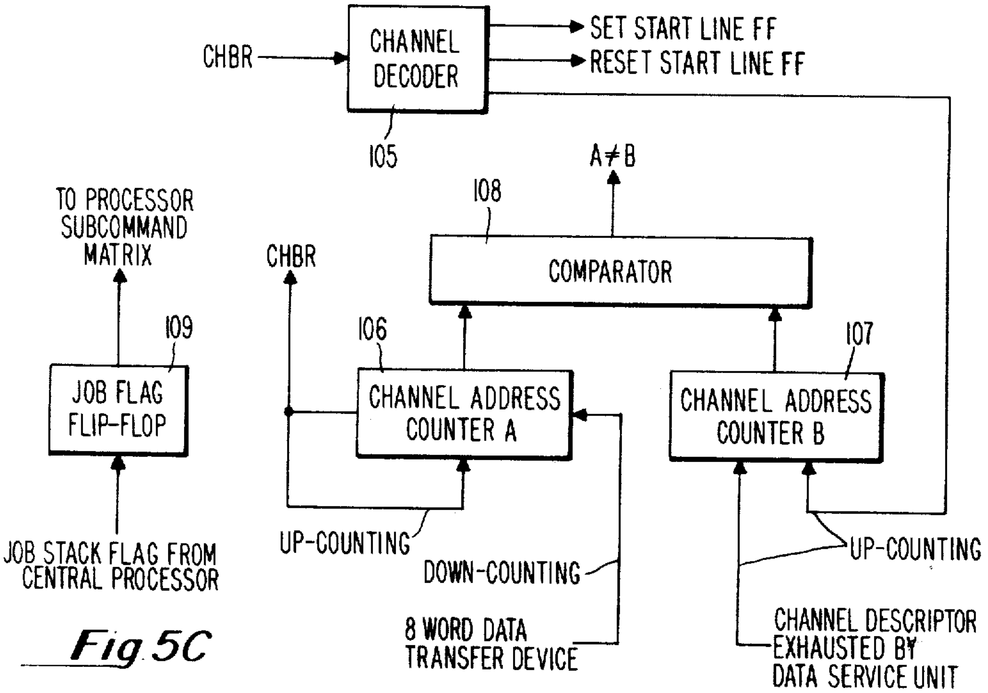
Figure 6:
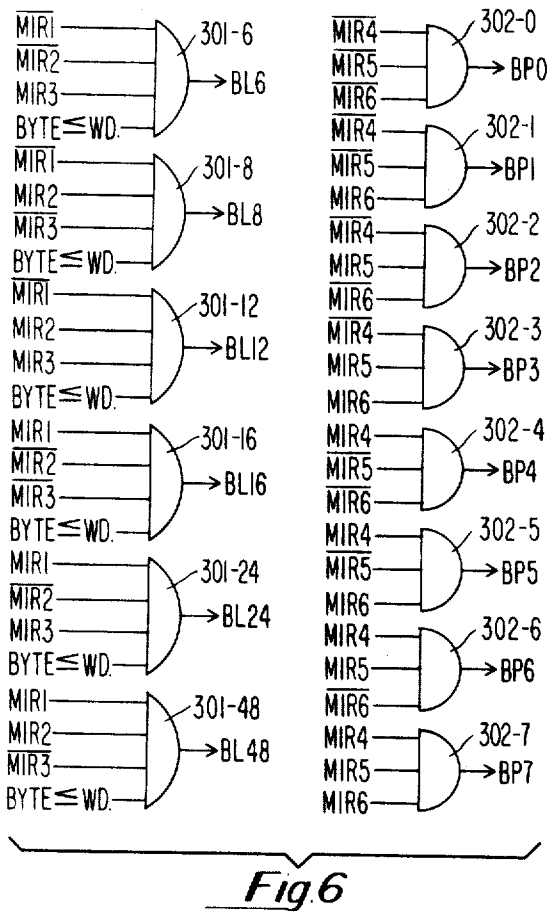
Figure 9A:
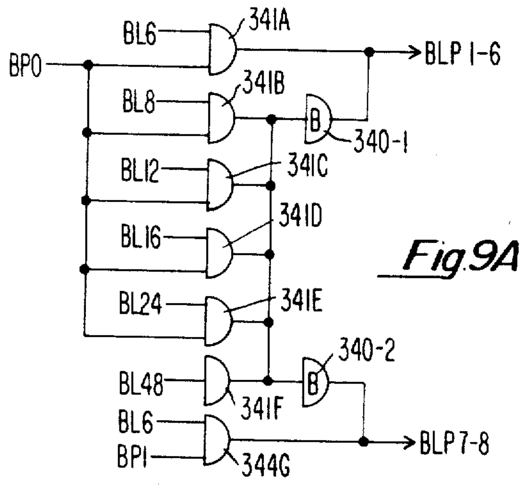
Figure 9D:
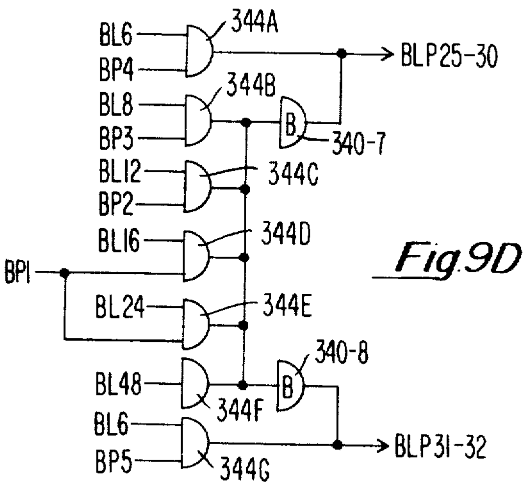
Figure 9B:
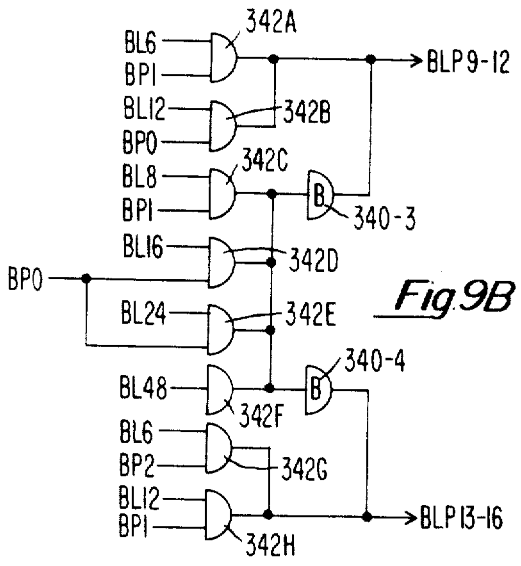
Figure 9E:
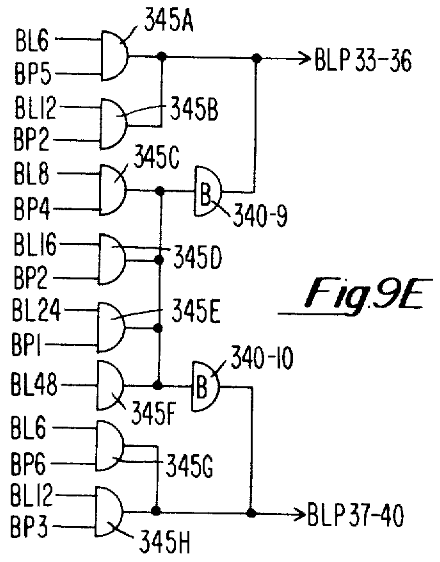
Figure 9C:
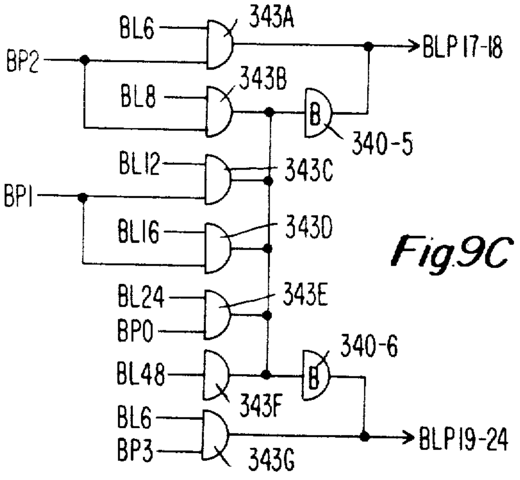
Figure 9F:
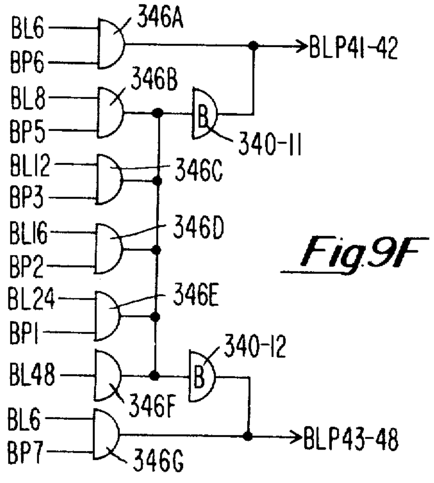
Figure 11C:
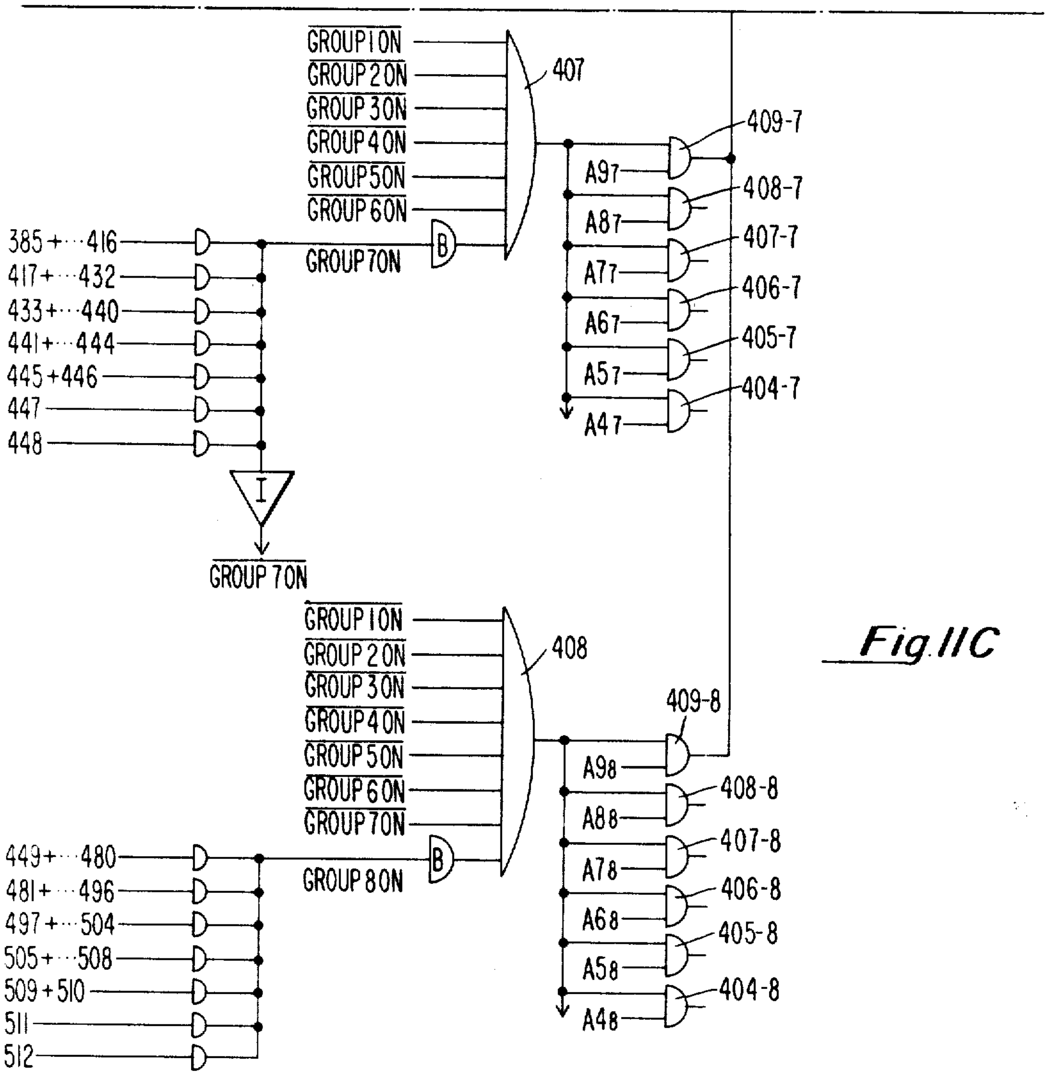
Figure 10A:
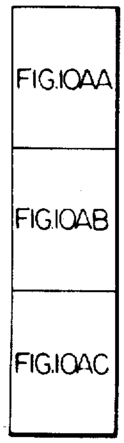
Figure 11:
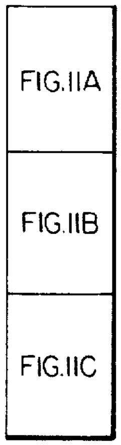
Figure 12:
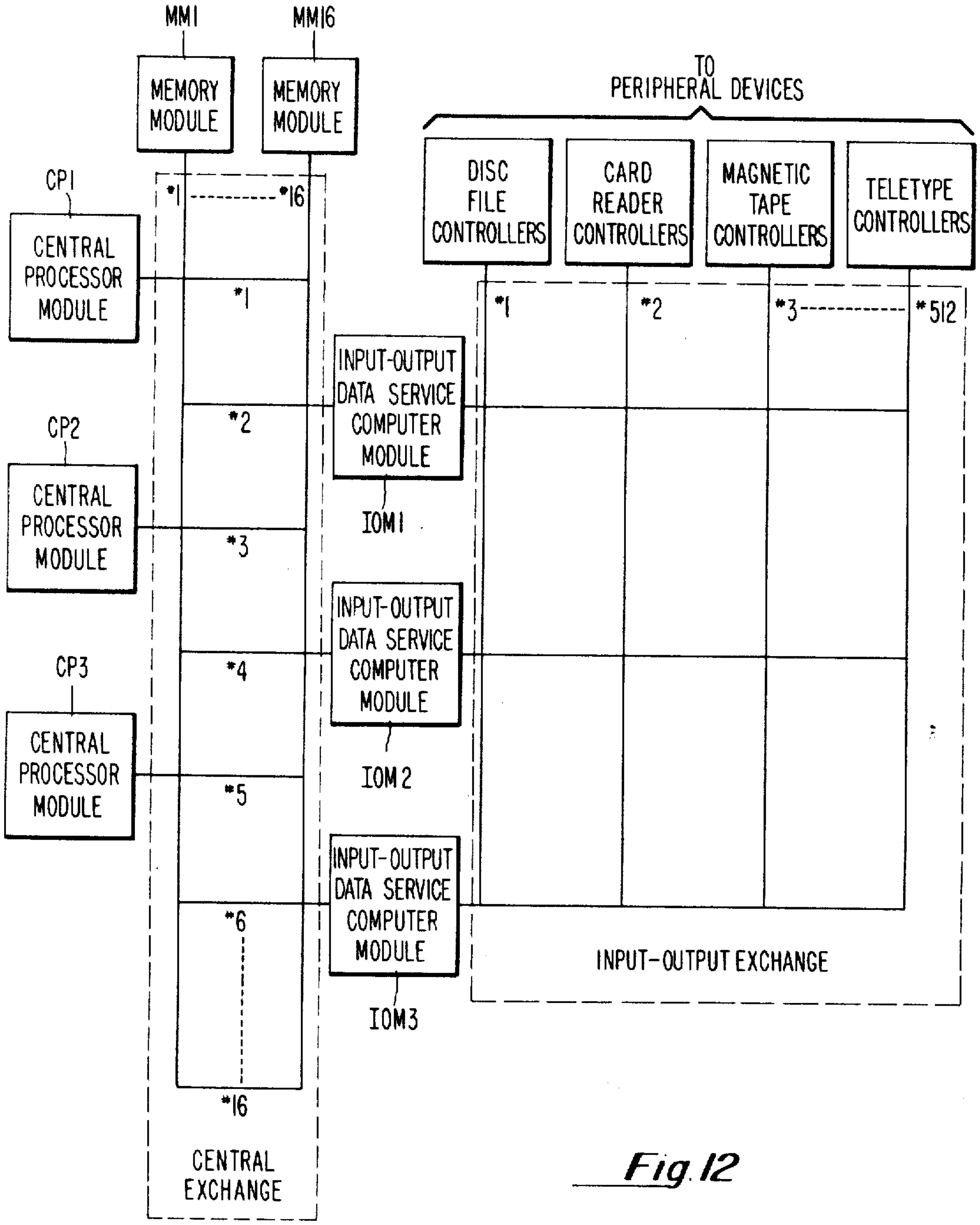
Figure 13:
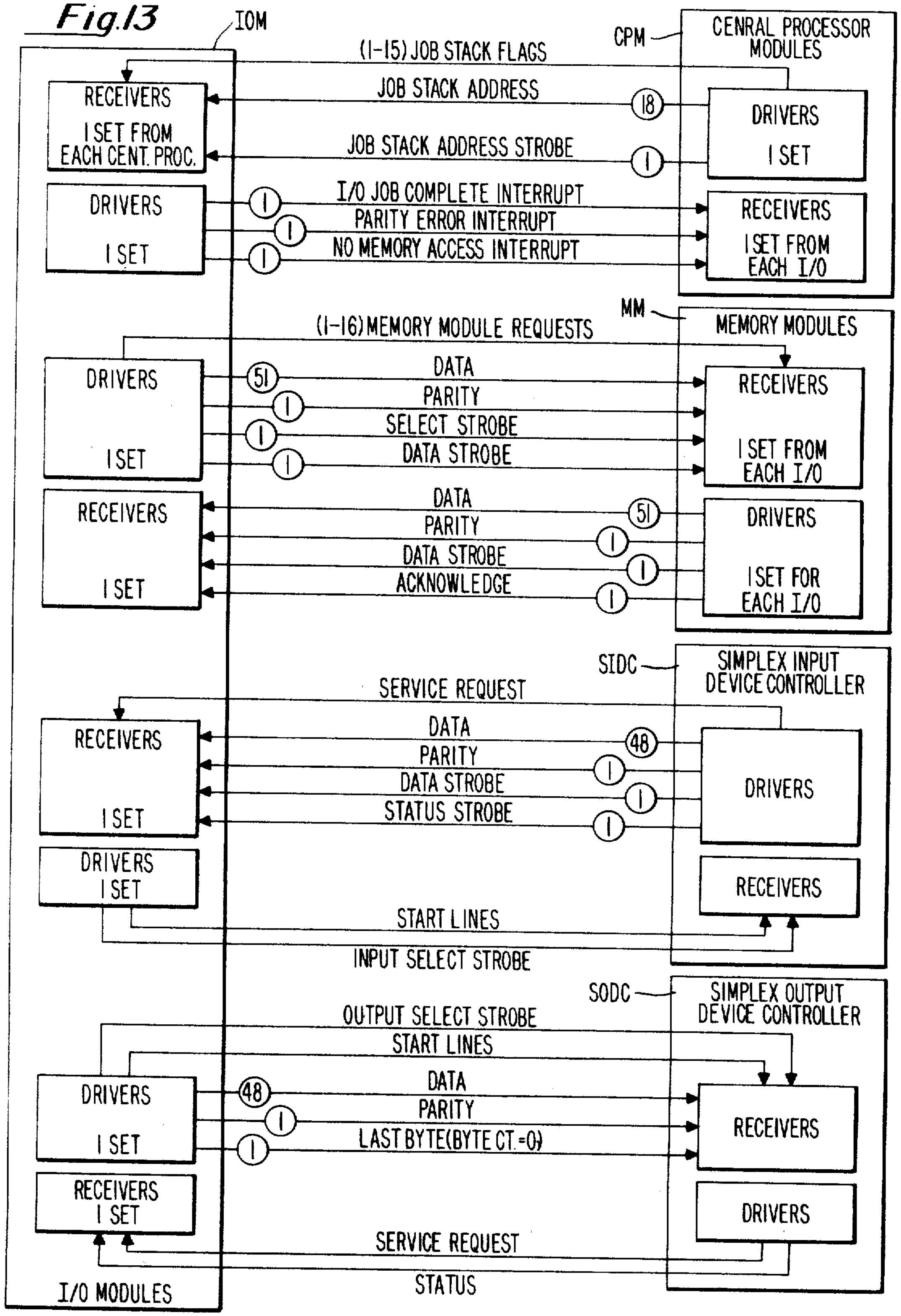

FIG. 3 is a format drawing showing the manner in which the drawings of FIGS. 3A to 3F are to be arranged to form a detailed schematic block diagram of the invention, FIGS. 3A to 3C being the schematic block diagram of the I/O processing unit, FIGS. 3D and 3E being the block diagrams of the local memory unit and the data service unit, and FIG. 3F being the detailed schematic block diagram of the communication unit of the invention;

FIG. 4 is a detailed block diagram of the contemplated physical arrangement of several of the processing unit registers which communicate directly with the operand registers of the arithmetic unit and the address modifying section of the input-output processing unit;

FIG. 5A is a detailed block diagram of the local memory unit of the invetnion, FIG. 5B illustrates word formats of the channel controls, and FIG. 5C illustrates alternative apparatus for monitoring and servicing program flags in the I/O processing unit;

FIG. 6 shows the logic gates of the byte length and position decoder of the invention;

FIGS. 7A through 7M, and FIGS. 8A and 8B when read together illustrate the byte insertion or selection gating of the invention;

FIG. 9, which consists of FIGS. 9A and 9F, shows alternative byte insertion or selection gating for the subject invention;

FIGS. 10 and 11 when read together constitute the priority resolver and address encoder of the subject invention; FIG. 10 consisting of FIGS. 10A through 10F, FIG. 10A being a format drawing showing the manner in which FIGS. 10AA to 10AC are to be arranged, and FIG. 11 being a format drawing showing the manner in which FIGS. 11A to 11C are to be arranged;

FIG. 12 shows a modular data processing system in which the input-output data service computer of this invention is shown connected as a module; and FIG. 13 shows the interconnections provided between the input-output data service computer and other components when utilized in the modular data processing system of FIG. 12.

Figure 1:
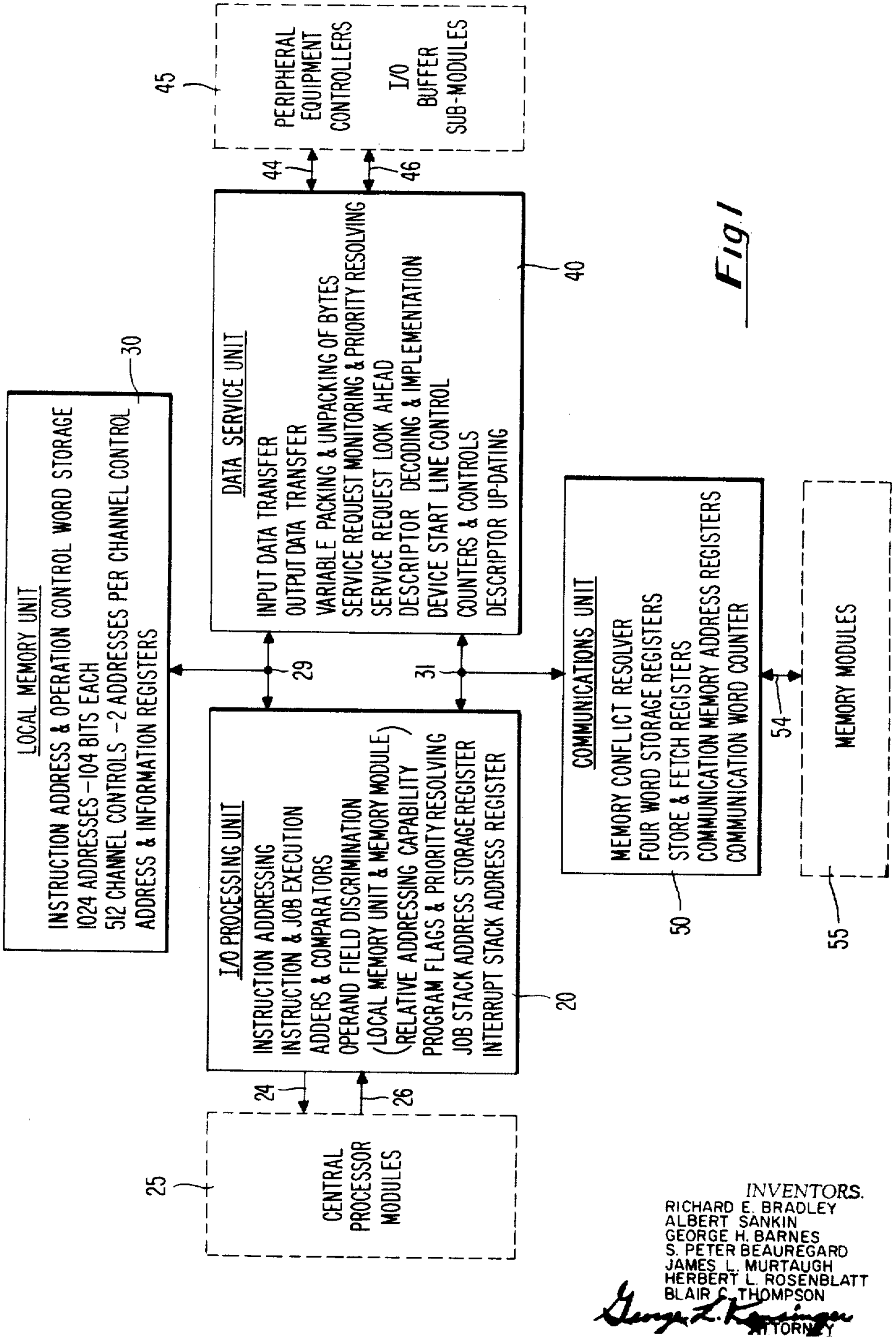
FIG. 1 is a block diagram of the input-output data service computer of the subject invention.

In FIG. 1 there is shown a block diagram of the input-output data service computer of the subject invention. Input-output processing unit 20 and data service unit 40 are each connected to local memory unit 30 by way of interconnections designated 29. Either the processing unit or the data service unit may make access to the local memory unit for writing or reading word portions of the channel controls so long as the memory unit is not busy servicing the other. Processing unit 20 and data service unit 40 may also each communicate through interconnections 31 with external memory communications unit 50, as shown. The communications unit contains a memory conflict resolver for awarding priority of communication with main memory modules 55 to the data service unit in order to avoid loss of data when both the processing unit and the data service unit are seeking access.

As shown, the I/O processing unit also has connections with central processor modules 25 when used in a system. Certain interrupt signals are communicated to the central processor over cable 24 and a main memory job stack address is communicated from the central processor to the I/O processing unit over cables 26. The processing unit includes a job stack address register for storing this main memory address from which new jobs can be obtained. Once a job has been received and a state word containing addressing information is stored into the local memory unit of the processing unit, the processing unit is then able to access program routines stored in an external memory by local memory to main memory relative addressing through the communications unit. Access to program instructions by the processing unit occurs upon the detection of program flag signals and the grant of priority of program service to one of the input-output channels. The processing unit executes the programmed instructions, utilizing its adders and comparators under control of operand field discrimination apparatus for constructing a channel descriptor as directed by the program, and stores the descriptor so constructed in the local memory unit.

Local memory unit 30 contains memory locations for storing a channel control for each of the input-output channels. Each channel control utilizes two addresses in the memory unit: one for the storage of a state word containing main memory addressing information, and the other for the storage of a descriptor which describes fully an information transfer to be performed, in addition to space for the buffering of input or output data bytes for the packing or unpacking of full data words for communication with main memory. Also shown included in the local memory unit in FIG. 3D are a memory write register, a memory information register, a memory address register and address decoder.

Data service unit 40 is connected to peripheral equipment controllers 45 which include I/O buffer submodules. The connections to the controllers of simplex output devices such as printers, card and tape punches and display devices are the cables designated 44. The connections to the controllers of simplex input devices such as punched card and punched paper tape readers and character recognition devices are the cables designated 46. Connections between the data service unit and the controllers for half duplex devices, such as magnetic tape units, disc files, or drums, or combined paper tape punching and reading apparatus, or Teletype-writers could be effected over either cables 44 or 46, provided the data lines are able to pass data in either direction, one direction at a time. Full duplex input-output devices such as some Teletype units, and some types of tape unit controllers, would utilize both interconnection cables 44 and 46 simultaneously.

Data service unit 40 monitors and resolves priority of input-output channel service requests, decoding and implementing channel descriptors directly from the local memory information register. Information transfer paths are provided for enabling information transfer between input and output devices and the local memory data buffer area or a main memory module through the communications unit. Also incorporated in the data service unit are a service request look-ahead capability for advanced strobing of input device controllers, device start line controls, and counters and controls for enabling and regulating input and output transfers to and from the device controllers.

Communications unit 50, in addition to the memory conflict resolver previously discussed, contains word storage registers, communication memory address registers, store and fetch registers, communication word counters, timing and controls. All data transmitted to and from the main memory as well as the fetching of new state words and program instructions and the storing of interrupt signal information is effected by communications unit 50 to main memory 55 over interconnection cabling 54, as shown. This information transfer may be a one word transfer or a sequence of words. Normal communication channels between the central processor and the main memory have been omitted from FIG. 1 for reasons of clarity.

Figure 2:
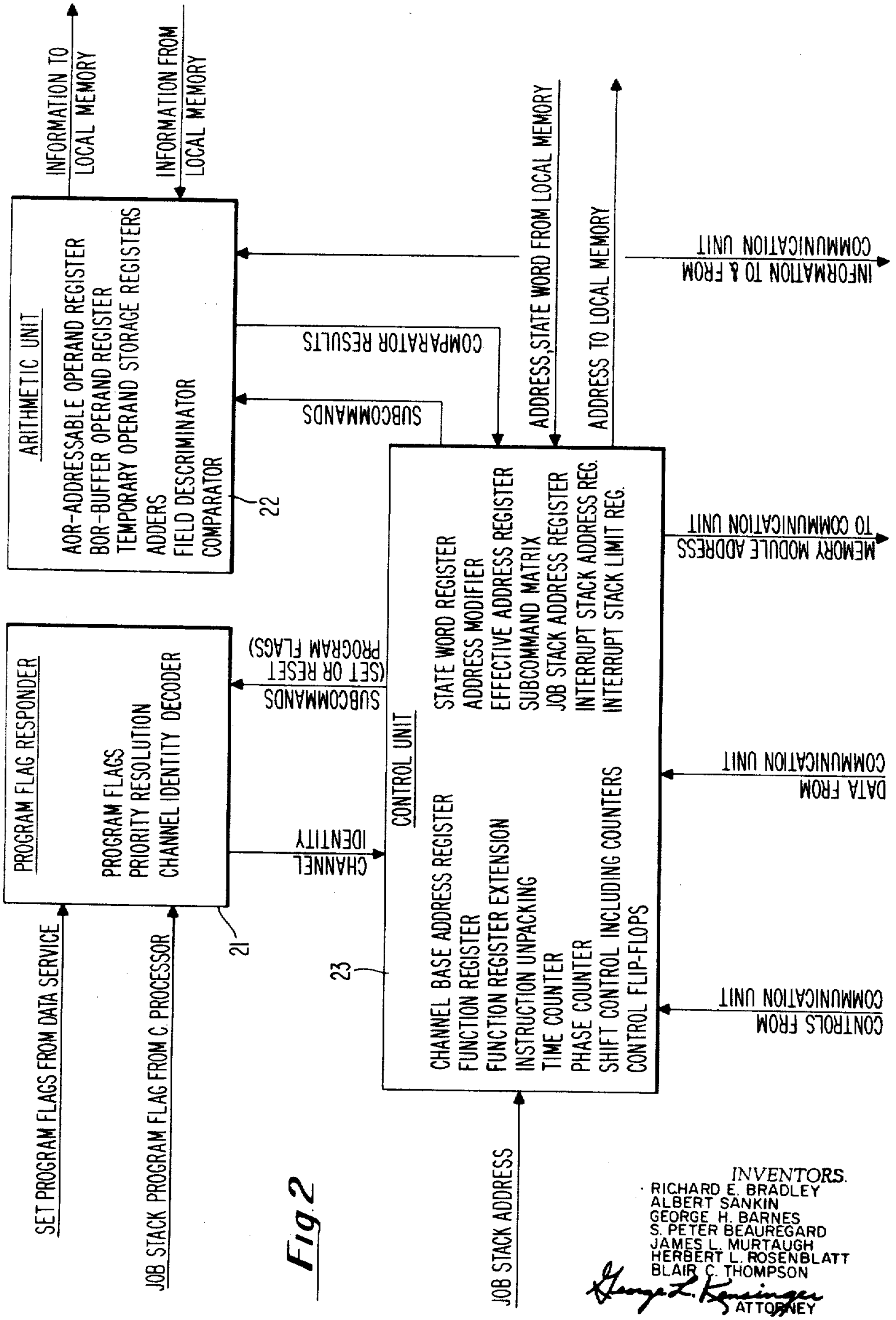
FIG. 2 is a block diagram of the I/O processing unit of the input-output data service computer of the invention.

FIG. 2 is a block diagram of the I/O processing unit of the novel input-output data service computer. As illustrated, the processing unit consists of a program flag responder 21, an arithmetic unit 22, and a control unit 23, which includes a subcommand matrix. The program flag responder contains a program flag flip-flop for each input and output channel and a flip-flop for the job stack program flag from the central processor which signals the presence of new jobs in an externally stored job stack, the address of which the I/O processor control unit stores in its job stack address register. Also included in the program flag responder is a priority resolver and address encoder for servicing the channel program flags and a channel identity encoder for resetting the program flags once serviced and for setting the input-output channel start line flip-flops, which may be reset under program control. As shown, the program flag responder communicates channel identity address information to the control unit which it stores in the channel base address register and receives subcommands from the control unit including commands to reset the program flags as they are serviced.

Control unit 23 contains a job stack address register for storing the location of externally stored input-output jobs which are to be successively accessed and performed by the data service computer and a state word register for storing new state words provided by new job stack entries from main memory. The control unit also contains an address modifier and effective address register for use in addressing both the local memory unit and the main memory unit. Upon obtaining instructions from main memory through the communications unit, storing them in the function register extension, and unpacking the instruction syllables and placing them in the function register, the control unit executes the instructions and addresses parameters previously placed in main memory for use in executing the assigned program.

The instructions of the program designated for the channel are executed by arithmetic unit 22 which includes addressable operand register AOR and buffer operand register BOR operating in conjunction with temporary operand storage registers, adders, and a comparator as indicated. Addressable operand register AOR also serves as an accumulator since the result of adding operands from the AOR and the BOR in the adders is returned to the AOR. The arithmetic unit also contains a field discriminator connected to the two operand registers for defining the field of the operands to be added or compared as directed by the instructions being executed.

The primary function of the arithmetic unit is to construct descriptors for describing information transfers under control of subcommands received from the control unit which are developed by decoding instructions obtained from a program routine in main memory. The arithmetic unit can access parameters directly from an external main memory through the communications unit and may transfer operands and results back through the communications unit. Operands can also be obtained from the local memory and either returned to local memory or modified to construct a new descriptor to be placed in the appropriate channel control in local memory.

A detailed schematic block diagram of the invention is illustrated in the drawings of FIGS. 3A through 3F which are to be read as one drawing as illustrated in the format drawing of FIG. 3. FIGS. 3A through 3C contain a schematic block diagram of the I/O processing unit, FIGS. 3D and 3E contain the block diagrams of the local memory unit and the data service unit of the invention, and FIG. 3F is a detailed schematic block diagram of the communication unit of the input-output data service computer.

The I/O processor unit as shown in FIG. 3 contains a program flag flip-flop for each input-output channel and a job stack flag flip-flop, designated 101, coupled to priority resolver and address encoder 102 which is coupled to deliver a channel address to channel base address register 103. Channel decoder 105 ascertains channel identity for setting the appropriate start line flip-flop 171 once the I/O processor has begun servicing a channel and resets the program flag 101 which was recognized. The channel decoder can also set any program flip-flop 101 and reset any start line flip-flop 171 under program control.

CHBR 103 is also connected to address modification base selector 112 for providing a local memory channel address or developing such an address in address modifying adder 114 by addition with the constant 001 or 010 supplied through address modifier selector 111. The channel control address thereby obtained is delivered to effective address register 116 for addressing the selected portion of a channel control, i.e., the state word, index register, or descriptor. The address from the effective address register is transmitted to local memory address register 166 and is decoded in address decoder 167 for causing the appropriate channel control portion to be brought into memory information register 162 and subsequently delivered to buffer operand register 120 from which it can be transmitted to addressable operand register 122.

Along with buffer operand register (BOR) 120 and addressable operand register (AOR) 122, the arithmetic unit of the I/O processor contains addressable storage register (HR) 123, temporary storage register (CR) 124, adders 126, comparator 127, and field discriminator 129. All communications into the arithmetic unit from the local memory unit and the external main memory through the communications unit are received by the buffer operand register BOR. All communications from the arithmetic unit to the local memory unit and to an external memory through the communications unit are by way of the addressable operand register AOR or the addressable storage register HR.

Once a state word is addressed in the local memory unit by the I/O processor unit, it is delivered by way of the BOR and the AOR to state word register 130. This register contains a portion for storing a parameter base address 131, an instruction base address 133, an instruction counter 134, and an activity bit. Associated with the state word register are index registers X1R 136 and X2R 137. Instructions in main memory are addressed by summing the instruction base address through address modification base selector 112 and the instruction counter through address modifier selector 111 in address modifying adder 114. The instruction address is transmitted to effective address register 116 and subsequently to communications address register 204 for delivery to main memory through communication unit drivers 212. The memory operation code for addressing instructions is loaded into the memory operation code area of communication address register 204 by subcommand matrix 150 of the I/O processing unit.

The instructions obtained from main memory may, for example, direct the I/O processor unit to construct a new descriptor for the input-output channel being serviced, may direct the processor to modify a channel state word, or may contain a channel control command such as "stop channel" when a complete input-output transfer job has been performed for resetting the active bit in the state word register, may order the resetting of a start line flip-flop upon detection of an error or malfunction in the operation of the device, or may command that the immediately preceding channel descriptor for a device be reinstated for repeating a transfer which was unsuccessfully attempted. Thus, upon detection of a parity error in writing upon or reading from a magnetic tape unit, for example, a program subroutine may order that the tape be rewound and that the write or read operation be updated. This repetition of incompletely performed information transfers may be repeated as many times in the program as desired, after which an instruction will direct the I/O subcommand matrix of the processing unit to send an interrupt information word for storage in the location in main memory identified by interrupt stack address register 157. This interrupt word, which is sent to main memory through the communication unit, includes the number of the input-output channel involved and the reason for termination, which could be, for example, input-output information transfer completed successfully, input-output device malfunction, printer buffer overflow, parity error detection from device, or an indication that more disc file or main memory locations are needed for completion of an information transfer. If a parity error is detected by the input-output communication unit in connection with reading from main memory, the I/O processor unit will send a parity error interrupt signal to the system central processor.

If the instruction received from main memory denotes completion of a transfer job by stopping the channel and resetting the active bit, the I/O processor subcommand matrix will send an I/O job completed interrupt to the central processor. This interrupt line signals that an interrupt stack entry has been sent by the I/O processing unit through the communication unit to the interrupt stack address location in main memory identified by the address in interrupt stack address register 157. The data processing system scheduling program is thereby signalled that a transfer job is completed on a particular input-output channel and that the channel can be assigned a new job by the central processor. When a new job is assigned, the central processor raises a job stack flag flip-flop in program flag flip-flops 101, which upon being granted service by the I/O processor unit will provide directly or indirectly by a new state word for the channel to be operated for performing the job.

The instructions obtained from main memory through communication unit receivers 215 and communication fetch register 217 are delivered to function register extension 140 by way of buffer operand register 120. Function register extension FRE 140 is a four word buffer register for receiving sequentially four instruction-containing words and providing syllables as needed to function register 145 under control of unpacking and formating device 142 and syllable counters and controls 143. As shown in the drawing, the function register extension FRE is capable of receiving and storing instruction-containing words having eight syllables. Since instructions require only one to six syllables as illustrated by function register 145, each instruction word obtained from main memory and stored in FRE 140 may contain parts of two or more instructions which will be unpacked and formated into function register 145 for controlling the operation of the I/O processing unit.

All instructions in the instruction repertoire of the input-output data service computer will contain as the first syllable an operation code which identifies the operation to be executed, such as load, store, add, complement, subtract, shift, jump, skip, transfer, subroutine jump or return, go, delay, link, or release processor. Also, in the preferred embodiment, a portion of the fifth syllable and the entire sixth syllable contains an address modifier to be used by the processor in obtaining parameters or operands for use in executing the instruction. The remaining portion of the fifth syllable contains a code for referencing the instruction to one or the other of index registers 136 and 137. Syllable four contains an address modifier P which may be used by the instruction for modifying the address appearing in syllables five and six. The second syllable of the instructions may contain shift control signals for directing that addressable operand register AOR be shifted by shift matrix 151 and to what extent in response to signals generated by shift control counters 147 and 148 which are decoded by decoder 149. In the preferred embodiment SCCA is given the number of one-place shifts that are to be performed in AOR122 and shift control counter B148 is given the number of octal shifts to be made in the AOR. Thus, for an addressable operand register containing 52 bits, seven clock pulses at most are necessary for shifting this register from one to fifty-one positions within the register.

The second and third syllables of the instruction format can alternatively contain first field bit and last field bit information for delivery to field discriminator 129 for controlling the fields of operand registers 120 and 122 which are to be utilized by the arithmetic unit. The instruction can designate that an operation be performed utilizing the field included between the first and last bit positions and may retain intact the excluded field. The second and third instruction syllables also may contain signals designating a shift or jump or a special variant syllable which may specify the direction of transfer between registers of the I/O processing unit or may contain a control signal for increasing or decreasing one or the other of index registers 136 and 137. This special variant syllable may be inverted in inverter 146 and delivered to address modifier selector 111 for modifying either index registers 136 or 137. The contents of the index register to be modified are delivered to address modification base selector 112 for being modified in address modifying adder 114 and returned to the index register by way of effective address register 116.

The most frequent use of the I/O processing unit is in the construction of descriptors in response to a set of instructions from a designated program in main memory which is assigned to the channel by the system executive scheduling program. It is important to note that the invention permits the assignment of more than one input-output channel to each of the programs and program routines stored in main memory since the I/O processing unit services only one channel at a time and since instructions and parameters are separately stored and separately addressed. Thus, many similar devices may be assigned to one program which will be identified in the instruction base address field of their state words since each may be assigned to a unique set of parameters by the parameter base address field of each channel word. The specific transfer to be accomplished by the channel, the amount of information to be transferred and the address to which the information is to be transferred, etc., can be assigned by the creation of a table of parameters in the main memory, there being a unique table for each input-output channel. The common use of program routines for the servicing of more than one of the input-output channels reduces the memory capacity required for storing programs in main memory. The multiple use of program routines also reduces to a minimum the number of programs which must be set up and permits the scheduling program to simply utilize available program routines which have been previously debugged, tested and simplified, rather than having to rewrite or recopy the program routines when assigning new information transfer jobs to the input-output channels.

In the preferred embodiment it has been found to be advantageous to group together the temporary storage registers, the entire state word register and associated index registers 136 and 137, and interrupt stack register 158 in order to minimize signal transfer paths and to reduce the space required for these registers in the processing unit. In the embodiment shown in FIG. 4 which utilizes 48 bit temporary storage registers and 18 bit index registers, and instruction and parameter base addresses, ten bit instruction counters, and a ten bit interrupt stack limit register, it has been found that separate grouping of these registers into subgroups 220, 230, 240 and 250 is desirable. As can be seen in the figure, each of the subgroups has inputs from addressable operand register AOR and buffer operand register BOR, in addition to inputs from the effective address register, the address modification sum, or a word counter in some instances.

Subgroup 220 is a two bit portion of the register grouping which contains the first two bits of temporary registers C and H plus the one bit activity indication 139, as illustrated. All other positions are unused or not applicable. The inputs are an AOR bit signal or a BOR bit signal which are gated as indicated by command signals in AND gates 221 and 222. Signal input line 227 is a representative signal line which corresponds to the second bit in each of the registers. Another input signal line would be provided for the first bit position. An output line is provided from the second bit position to the corresponding AOR bit position as indicated. Selection of the register to be effected by the input is accomplished under control of the write control signals W or the enable read control signals E provided to each register portion of each subgroup.

Subgroup 230 comprises ten bit positions of C register 124 and H register 123, as well as ISLR 158 and instruction counter 134, including its last two bit positions which are designated 135. The input to this subgroup over representative input signal line 237 is an ORed function of gated signals from the AOR, BOR, address modifier sum and in the case of the least two significant bits of the instruction counter, a word counter. The output of this subgroup is transmitted to appropriate bit positions in the AOR, and in the last two positions, to the word counter. After being gated with enable read control signals in AND gate 238, the output is delivered to an appropriate position in address modifier selector 111 which also receives gated inputs from a gated function of $EAR+ISA+JSA+\overline{FR(V)}+FR(INC)$ as illustrated.

The third subgroup 240 contains 18 bit positions of CR and HR in addition to index register 137 and the instruction base address register 133. Gated inputs from the AOR, the BOR, and the EAR are ORed to representative input line 247. An output is provided from each position to a comparable AOR position and is also delivered to an address modification base selector position after being gated with enable read signals in AND gate 246.

Subgroup 250 contains 18 bit positions of the CR and HR in addition to index register X1R136 and the parameter base address 131. Inputs from the AOR, EAR, AM sum, and the BOR are gated by control command signals and then ORed together over representative input line 257. Each position provides an output to a corresponding AOR position and after being gated with enable read control signals 256 are outputted to an address modification base selector position, as is also a gated signal from CHBR103 and a corresponding position in the AOR as indicated.

The primary function of the I/O processing unit is to construct descriptors each of which describes a specific information transfer to be performed in response to instructions provided by an external addressable program store and thereafter transmit the descriptor so constructed to the local memory unit. The descriptor is delivered to local memory write register 164 from the AOR and written into local memory thin film stack 160 at the address location transmitted to local memory address register 166 by effective address register 116. The transferring and storing of a descriptor by the processing unit will occur only if the memory is not busy under control of the data service unit for servicing a data transfer. After delivery of a newly constructed descriptor to the local memory by the I/O processor, the next program instruction may release the processor from the service of that program and enable it to scan program flag flip-flops 101 for servicing programs on other channels.

The I/O processing unit shares the local memory unit with the data service unit but otherwise operates independently of and asynchronously to the data service unit. The I/O processor also shares the communication unit with the data service unit, access priority being controlled by the operation of timing and control 200 and indicators 201 and 202 in conjunction with communication priority resolver 203.

A detailed representation of the manner of addressing a channel control in the local memory unit is illustrated in FIG. 5A. As shown, thin film memory stack 260 contains for each channel control a state word, an index register field, a descriptor, and a data field. The state word and indexes are stored as one memory word in the local memory unit. The descriptor and data field are also stored as one memory word. Memory write register 264 and memory information register 262 are both capable of transmitting separately any of the four portions of a channel control.

In the preferred embodiment there are 512 input-output channels and therefore nine bits are required for addressing any one of the channel controls. The address stored in the channel base register therefore contains nine bits which are inserted into the 8 through 16 bit positions in address modifying adder 114 and effective address register 116. In order to select a specific portion of a channel control, a constant is inserted into address modifying adder 114 at bit positions 17 and 18 and transmitted to effective address register 116. Ten of the address location bits are then transmitted by the EAR directly to local memory address register 266 and to address decoder 267 for selecting one word of a channel control consisting of a state word and index field or a descriptor and data field. The least significant bit of the local memory address, which is bit 18 in the effective address register, is presented, along with its inverse from inverter 118, to control gates 259, 261 for reading out the desired portion of the selected channel control to BOR 120 or to gates 263 and 265 respectively for writing one or both portions of the selected channel control in the memory unit from A operand register 122. Provision is also made for copying a portion of a channel control back into the local memory unit through gates 268 and 270 in response to copy memory signals CMB or CMA upon being gated by the control signals CB or CA.

FIG. 5B is a detailed illustration of sample channel control 161, there being 512 channel controls in the preferred embodiment. Each channel control contains a state word control designated 161–1 and a descriptor word control designated 161–2.

State word control 161–1 contains a state word, index registers and an unused word portion. The state word itself comprises an instruction counter IC, an instruction base address IBA, and a parameter base address PBA. Index registers X1R and X2R and an unused portion constitute the remainder of the state word control 161–1X as shown.

As illustrated, descriptor word control 161–2 contains a descriptor word and a data buffer field. A descriptor comprises the following information: byte size code, byte position code, control code, byte count, device status code, and main memory address. The remainder of the descriptor word 161–2X is available for use as a data byte buffer by the data service unit.

FIG. 5C illustrates an alternative apparatus for monitoring and servicing program flags in the I/O processing unit which may be substituted in place of priority resolver and address encoder 102 and program flag flip-flops 101. In this embodiment the program flags, in the form of the numbers of the channels which are awaiting program service by the processing unit, are stacked in the unused portion of the state word controls in the local memory unit in the order in which they arise. Two channel address registers, channel address counter A106 and channel address counter B107, are utilized for recording the existence and location of program flags in the memory unit and are used in addressing the program flags.

Channel address counter A106 stores the local memory unit address of the next program flag to be serviced and channel address counter B107 stores the next vacant program flag address in the state word control portion of the local memory unit. The addresses in counters A and B are tested for equality in comparator 108, and if unequal, the channel address located in counter A106 is placed into channel base address register CHBR and counter A106 is upcounted by one at the same time.

In the initial state, channel address counters A106 and B107 are both zero. The processor begins operation upon recognizing a job stack flag from the central processor in job flag flip-flop 109 and fetches a state word from main memory and may up-count channel address counter B107 by one. Comparator 108 then detects inequality between channel address counters A and B and the processor subcommand matrix delivers the channel address in counter A106 into channel base address register CHBR and at the same time up-counts channel address counter A106. The processor will proceed to fetch the channel number stored in the zero channel position in the local memory unit and enter it into CHBR since channel address counter A had read zero. The processor will then fetch the state word associated with the channel number received and will execute the program of that channel.

Channel address counter B107 can be up-counted either by the processor unit under program control through channel decoder 105, or by the data service unit upon channel descriptor exhaustion, as indicated. Every time the channel address counters are unequal as determined by comparator 108, the processor unit will go to the portion of the state word control designated for program flags for obtaining the number of the channel which is to be next granted program execution service. Thus the state word control portion of the local memory unit which is designated "UNUSED" in FIG. 5B will be operated as a first in-first out (FIFO) program flag storage stack of the identification of channels to be given program service. Each time a program flag address is taken from channel address counter A106, that counter is up-counted by one so that it will point to the next program flag which will be the number of the device to be next given program service.

An important feature of this embodiment is a provision for giving priority to certain high signal rate input-output devices such as disc files which transfer data in groups or bytes of eight words each. This priority is granted to the disc files by down-counting channel address counter A106 upon recognition that a program service is required for such a channel and the channel number of that device is inserted into the address in the local memory unit of the down-counted contents of the channel address counter A106. Therefore, the processor unit upon detecting inequality between counters A and B, will first address the program flag of the disc file which is located at the address indicated by counter A regardless of whether other program flags are stored in other addresses in the local memory unit.

Returning to FIG. 3, service of the descriptor is placed in local memory stack 160 and performed by the data service unit. The first prerequisite to servicing an input-output channel is that the start line flip-flop 171 for the input-output channel must have been set by the program. This flip-flop is set from channel decoder 105 in the processing unit, as shown.

The device to be operated, whether it be an inputting device or an outputting device, raises its service request flag when available for the transfer of a byte of information and sets its service request flip-flop 172. Priority resolver and address encoder 173 scans the service request flip-flops and, upon awarding priority and encoding an address, sends a signal which starts counters and controls 174 of the data service unit as illustrated and transmits the address of the channel given recognition to channel look-ahead register 175. The channel address is examined by decoder 176 and if designating an input device and if the input byte is present in the device controller, an input select strobe is sent to the device controller to strobe the byte into input register 193. Decoder 177 at this time also determines if a four or eight word inputting device is involved, and if so, it enables gate 178 for permitting the inputted information to pass directly from receivers 192 through input register 193 to the communication unit, thus bypassing byte insertion or selection gating 191.

As soon as the local memory unit is not busy, indicator 169 enables gate 179 and permits the recognized input-output channel address to be transmitted to processing address register 180.

A signal is sent to the address register of the local memory unit for accessing the descriptor word, including the data buffer portion, into memory information register 162. The byte size and byte position codes are delivered to byte length and position decoder 190 for enabling gating 191 to insert the byte into local memory write register 164 for inputting devices or to select a byte from memory information register 162 for delivery to an outputting device through output register 196 and drivers 197. Decoder 181 examines the channel address in PA register 180 and delivers an output select strobe to the device controller if it serves an output device which accepts bytes less than or equal to a word of data. Decoder 182 sends signals to counters and controls 174 which indicate the amount of data to be sent out and provides an enabling signal to byte length and position decoder 190 if the transfer is to be a word or less. A signal is generated at this time by counters and controls 174 for strobing the data byte from the input register to local memory write register 164 or to communication storage register 206 or 207 or from local memory information register 162 or communication fetch register 217 to the output register. Control signals are generated by decoder 181 for resetting the start line flip-flop involved upon error, malfunction, or termination status detection and for setting the program flag flip-flop 101 for the channel upon exhaustion of the byte count field of the descriptor which signifies that the transfer of a block of information has been completed.

Upon receiving a not-busy signal from either indicator 201 or 202 of the communication unit, the selected channel address is then delivered to output address register 185 by gate 183. The output address register is then decoded for delivering output select strobes to controllers of devices capable of receiving four or eight word outputs by decoder 186 upon the receipt of information from main memory through the communication fetch register to output register 196. Decoder 187 produces signals to indicate if a four or a eight word output transfer is involved, in which case gate 188 will be enabled to permit the direct transfer of information from communication unit fetch register 217 directly to drivers 197 through parity generator 195 and output register 196, thus bypassing byte insertion or selection gating 191.

Parity check 194 examines parity of information received from inputting information devices and delivers its signal to counters and controls 174. As indicated, a status signal from the output device controllers is also delivered to counters and controls 174 to enable counters and controls 174 to prevent information transfer to inoperative or disconnect devices.

The communications unit has two storage registers 208 and 209 with which are associated address registers 206 and 207. Indicators 201 and 202 indicate whether or not information is accumulated in the storage registers awaiting delivery to a main memory module. Both information signals and memory address signals are communicated to the main memory module by way of communication storage register 211 and drivers 212. The memory address is transmitted from either effective address register 116 of the processing unit or from memory information register 162 by way of X and Y address registers 206 and 207 to communication address register 204 and subsequently to communication store register 211 through parity generator 210. In addressing a main memory module, the memory module code portion of communication address register 204 is examined by decoder 214 for sending a request to the particular memory module involved. Upon receiving an acknowledging signal from the memory module through receivers 215 into timing and control 200, the memory module address is transmitted to the memory module by drivers 212, followed by the information signals from the communication storage register. Decoder 213 examines the memory operation code in communication address register 204 for determining the number of words to be included in the transfer. The parity of information signals received from main memory by receivers 215 and communication fetch register 217 is examined by parity check 218 which signals timing and control 200 directly.

Upon transfer of a byte of information between the local memory unit and a device controller or between the main memory unit and a device controller, descriptor field modifying counter 199 updates the descriptor by taking fields from memory information register 162, modifying them, and returning them to local memory write register 164. Upon updating the channel descriptor and returning it to the local memory thin film stack, the local memory unit is released and the data service unit is available to service the next input-output device having priority in accordance with its descriptor as soon as the local memory unit is not busy servicing the I/O processing unit.

Interrupt stack limit register ISLR 158, which records the number of entries available in the main memory interrupt stack, is decreased by one each time an interrupt entry is made. Upon the detection that the ISL is zero by decoder 159, no more entries are attempted in the stack. Decoder 117 signals the I/O subcommand matrix when the contents of effective address register 116 equal zero. This decoder may be used for testing the index registers when desired under program control.

Time counter 153 and phase counter 154 provide control signals to the subcommand matrix for clocking the cycles of operation of the input-output processor. Control flip-flops 156, which may be set and reset under program control as indicated, control the operation of the processing unit in skipping or jumping in program instructions as in the sub-routine jump and the skip instructions. The setting of the mode flip-flop specifies whether the I/O processor is engaged in executing channel programs or is accessing new state words from the external job stack.

FIG. 6 shows the logic gates of the byte length and position decoder of the invention which is designated 190 in FIG. 3D. The inputs to gates 301 are the first three bit positions of the channel descriptor which comprises the bit length code and the inputs to gates 302 are the next three bit positions of the descriptor which constitutes the bit position code. The inputs to these decoder gates are taken from memory information register 162 as shown in FIG. 3D. Six of the eight possible states of the bit length code are used in gates 301 to produce a signal for each size of byte length to be utilized in the input-output data service computer. All eight different permutations of the bits of the bit position code are utilized by gates 302–0 through 302–7 to produce signals for use in specifying the position for insertion or selection of a byte of one of the specified byte lengths.

FIG. 7, which consists of FIGS. 7A through 7M, and FIG. 8, when read together, illustrate the byte insertion or selection gating of the invention which is designated 191 in FIG. 3D. Each of FIGS. 7A through 7M have six gates A through F for individually receiving the six bit length signals produced by decoder gates 301 of FIG. 6. In FIG. 7A, gates 311A through 311E each receive the bit position signal BP0 as an input, gate 311F having only BL48 as its input. The outputs of the AND gates 311 are ORed together to produce a signal which indicates that a byte is to be placed or taken from the first six bit positions of the data buffer word BLP1–6. Inverter 310–1 is utilized for providing the inverse of this bit length and position signal.

Figure 7A:
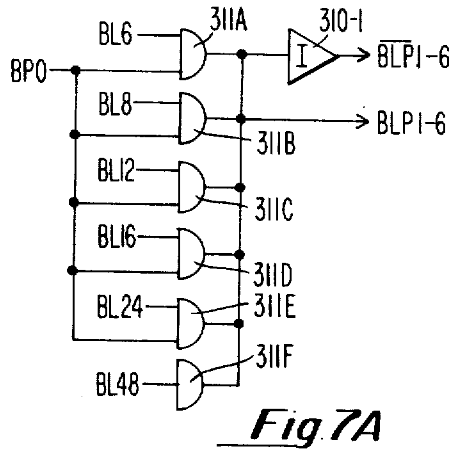
Figure 7B:
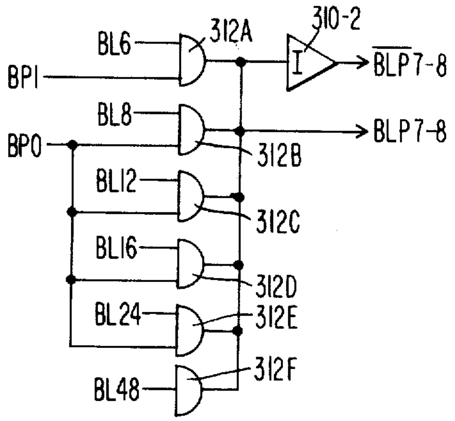
Figure 7C:
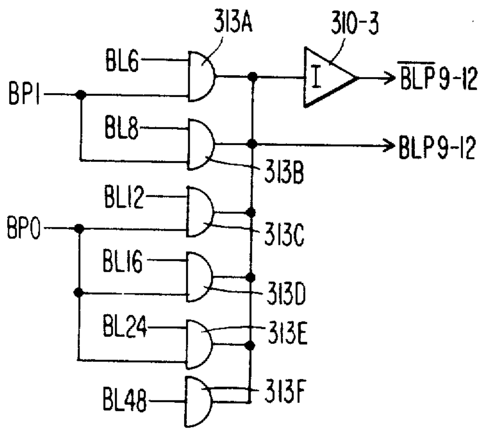

In FIG. 7B, BP1 is an input of gate 312A and BP0 is an input of gates 312B through E, while gate 312F has only BL48 as an input. The ORed output of gates 312 is BLP7–8 which is inverted in inverter 310–2 for supplying the inverse of the signal. BP1 and BP0 are also used as inputs to gates 313 of FIG. 7C as shown. The output of gates 313 are ORed to produce the BLP9–12 signal and inverted in 310–3 to produce the inverse signal.

Figure 7D:
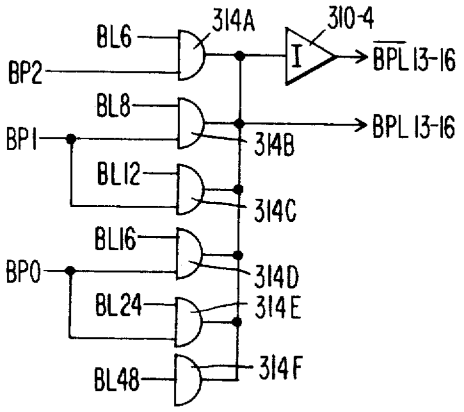
Figure 7E:
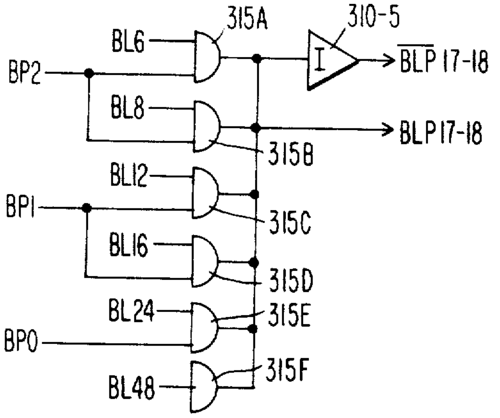

The bit position signals BP2, BP1 and BP0 are used as inputs to gates 314 of FIG. 7D and 315 of FIG. 7E. The outputs of these AND gates are ORed together to produce the BLP13–16 signal and through inverter 310–4 its inverse in FIG. 7D and to produce BLP17–18 and its inverse by inverter 310–5 in FIG. 7E.

Figure 7F:
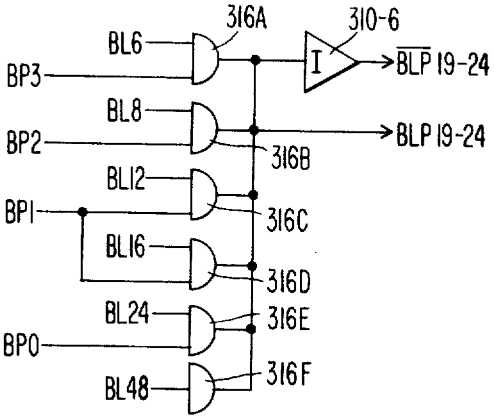
Figure 7G:
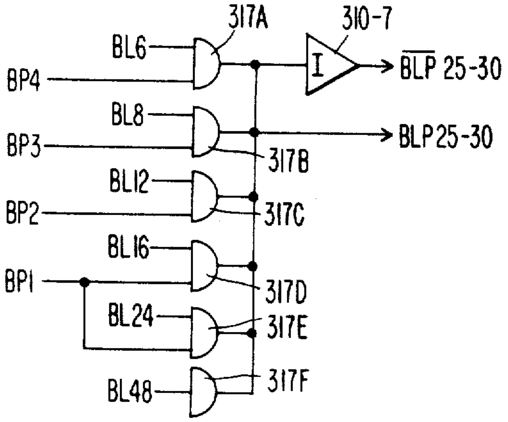
Figure 7H:
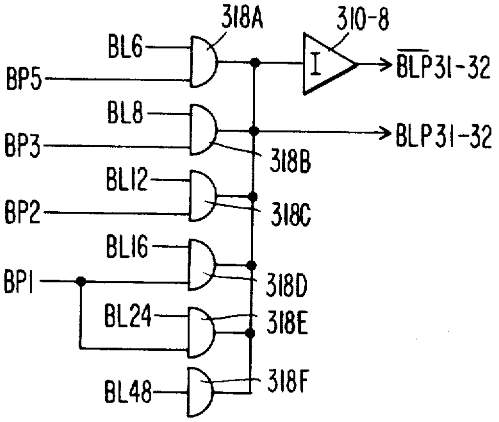

The bit position signals to FIG. 7F AND gates 316 are BP3, BP2, BP1 and BP0. The outputs produced are BLP19–24 and its inverse. In FIG. 7G, bit position signals BP4, BP3, BP2 and BP1 are used as inputs to AND gates 317 to produce output signals BLP25–30 and its inverse. Bit position signals BP5, BP3, BP2, and BP1 are utilized as inputs to AND gates 318 in FIG. 7H to produce output signals BLP31–32 and its inverse through inverter 310–8.

Figure 7J:
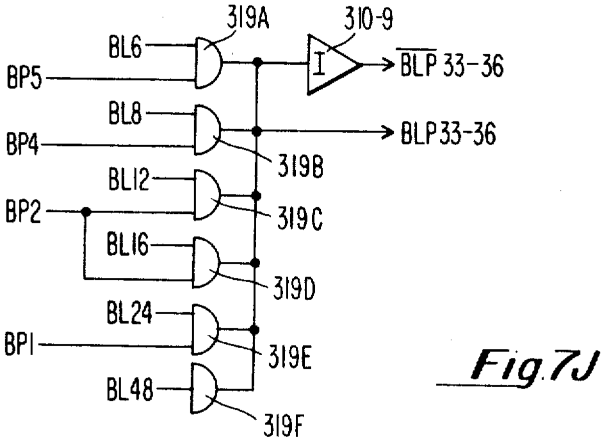
Figure 7K:
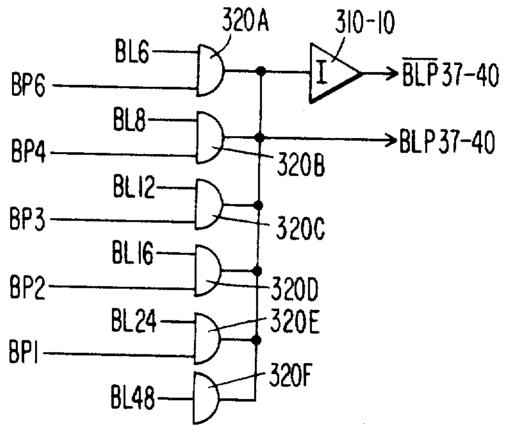
Figure 7L:
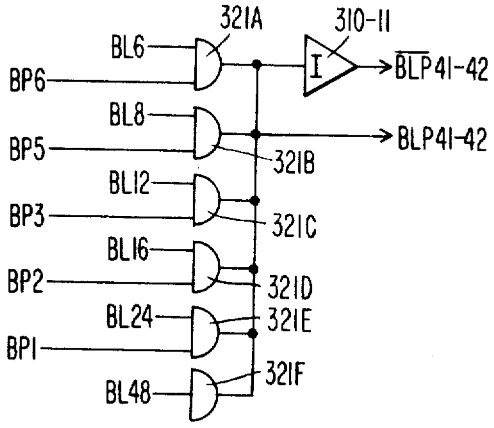
Figure 7M:
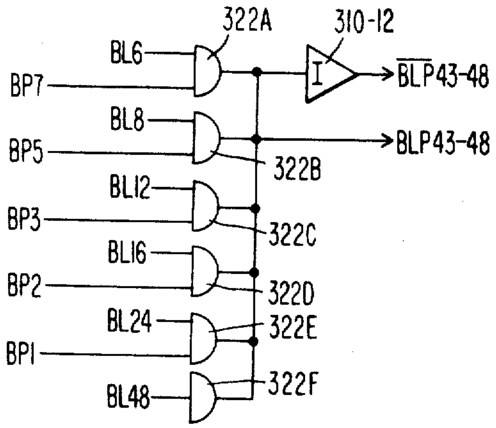

FIG. 7J utilizes BP5, BP4, BP2, and BP1 as inputs to AND gates 319 for producing BLP33–36 and its inverse. AND gates 320 of FIG. 7K utilize BP6, BP4, BP3, BP2, BP1 as inputs to produce output signal BLP37–40 and its inverse. Bit position signals BP6, BP5, BP3, BP2, BP1 are utilized as inputs to AND gates 321 of FIG. 7L to produce output signal BLP41–42 and its inverse. AND gates 322 of FIG. 7M utilize as inputs BP7, BP5, BP3, BP2, and BP1 to produce output signal BLP43–48 and its inverse through inverter 310–12.

Figure 8A:
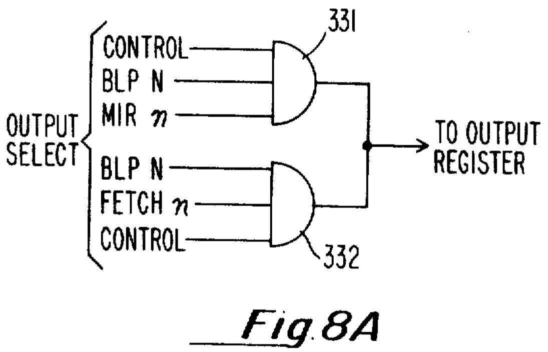
Figure 8B:
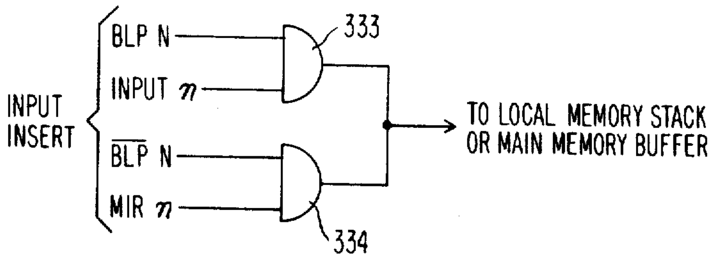

FIG. 8, which consists of FIG. 8A and 8B, illustrates the gates which enable the selective insertion or selection of bit positions within a desired byte. In FIG. 8A a gate 331 receives inputs from a corresponding bit signal from memory information register 162 and one of the bit length and position signals developed in FIGS. 7A through 7M, for transferring a bit from the memory information register to the output register upon actuation of a control. A gate 332 receives one of the bit length and position signals from FIGS. 7A through 7M and a corresponding bit signal from communication fetch register 217 for transferring a bit position from that register to the output register upon receipt of a control signal. AND gates 331 and 332 of FIG. 8A, therefore, comprise the final gates of the output selection gating apparatus.

In FIG. 8B, a gate 333 receives one of the bit length position signals and a bit signal from the input register for transferring an information bit to the local memory stack or main memory buffer. A gate 334 receives the inverse of the bit length and position signal and a bit signal from the memory information register for transferring a bit from that memory register to the local memory stack or main memory buffer. Thus, gates 333 and 334 comprise the final two gates of the input insertion gating apparatus of the invention.

FIGS. 9A through 9F show alternative bit insertion or selection gating for the subject invention which is designated 191 in FIG. 3D. By receiving input signals from each of the bit length gates 301 and bit position gates 302 of FIG. 6, the AND gates 341 of FIG. 9A produce bit length and position signals BLP1–6 and BLP7–8, buffers 340–1 and 340–2 being used to equalize signal magnitudes as illustrated. The inverse of these bit length and position signals can be obtained by incorporation of inverters as in FIGS. 7A through 7M. Gates 342 of FIG. 9B gate together bit position signals and bit length signals to produce BLP9–12 and BLP13–16. These may be inverted as necessary. AND gates 343 of FIG. 9C receive bit length and bit position signals to produce BLP17–18 and BLP19–24. The AND gates 344 of FIG. 9D receive bit length and bit position signals to produce BLP25–30 and BLP31–32. The AND gates 345 and 346 of FIGS. 9E and 9F receive bit length and bit position signals to produce respectively BLP33–36, BLP37–40, and BLP41–42, BLP43–48. All the buffers 340 utilized in FIGS. 9A through 9F are similar and are used to equalize signals and loading in the circuits.

The bit length and position signals produced by the gating circuits of FIGS. 9A through 9F may be used as the BLP inputs to the gates of FIGS. 8A and 8B, which constitute the final gates of the input insertion and the output selection gates of the invention. The inverted bit length and position signal required as an input to gate 334 of FIG. 8B can be obtained by inverting the appropriate BLP signal of the circuits of FIGS. 9A through 9F.

FIGS. 10 and 11 when read together constitute the priority resolver and address encoder of the subject invention which is designated 173 in the data service unit as shown in FIG. 3D and designated 102 in the input-output processing unit as shown in FIG. 3B. FIG. 10 consists of FIGS. 10A through 10F, FIG. 10A being a format drawing showing the manner in which FIGS. 10AA to 10AC are to be arranged to form the detailed logic gating for the gates of FIG. 11.

In FIG. 10A, which consists of FIGS. 10AA through 10AC, the first 64 flag flip-flops and their inverse signals are gated to produce a signal designated A91, which will be high for any flip-flop whose binary equivalent number ends in a "1," that is, a flag given an odd decimal number. Buffer elements 351, 352 and 353 are utilized for buffering signals obtained from gating the first 8 flags, the next 24 flags, and the last 32 flags which signals are ORed together to form the A91 signal. There will be a separate A9 signal generated for each succeeding block of 64 flags, there being a total of eight blocks in all if 512 flags are to be serviced.

Figure 10B:
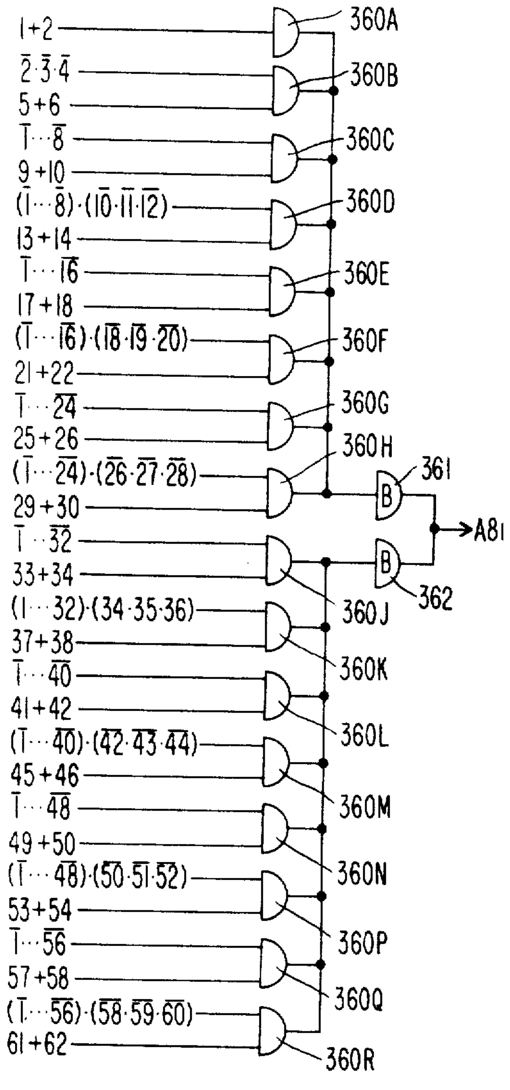
Figure 10C:
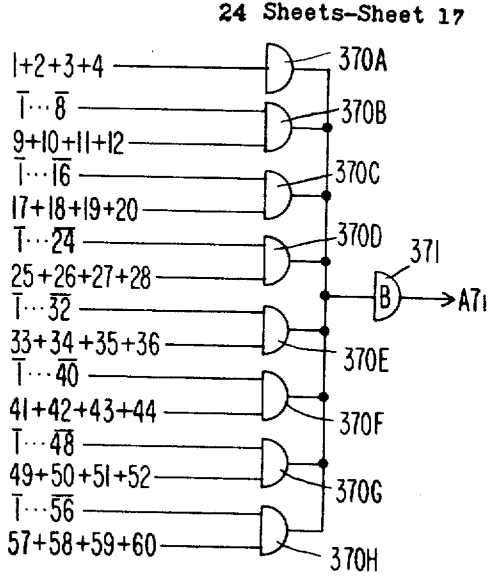
Figure 10D:
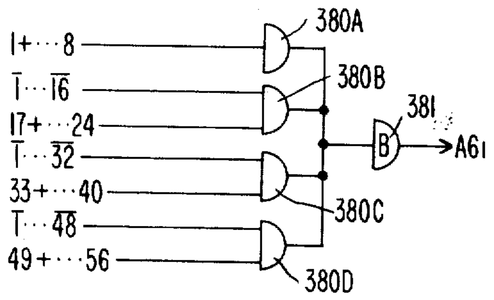
Figure 10F:
Figure 10E:
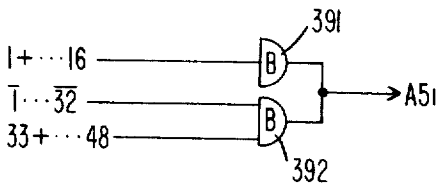
Figure 10A:
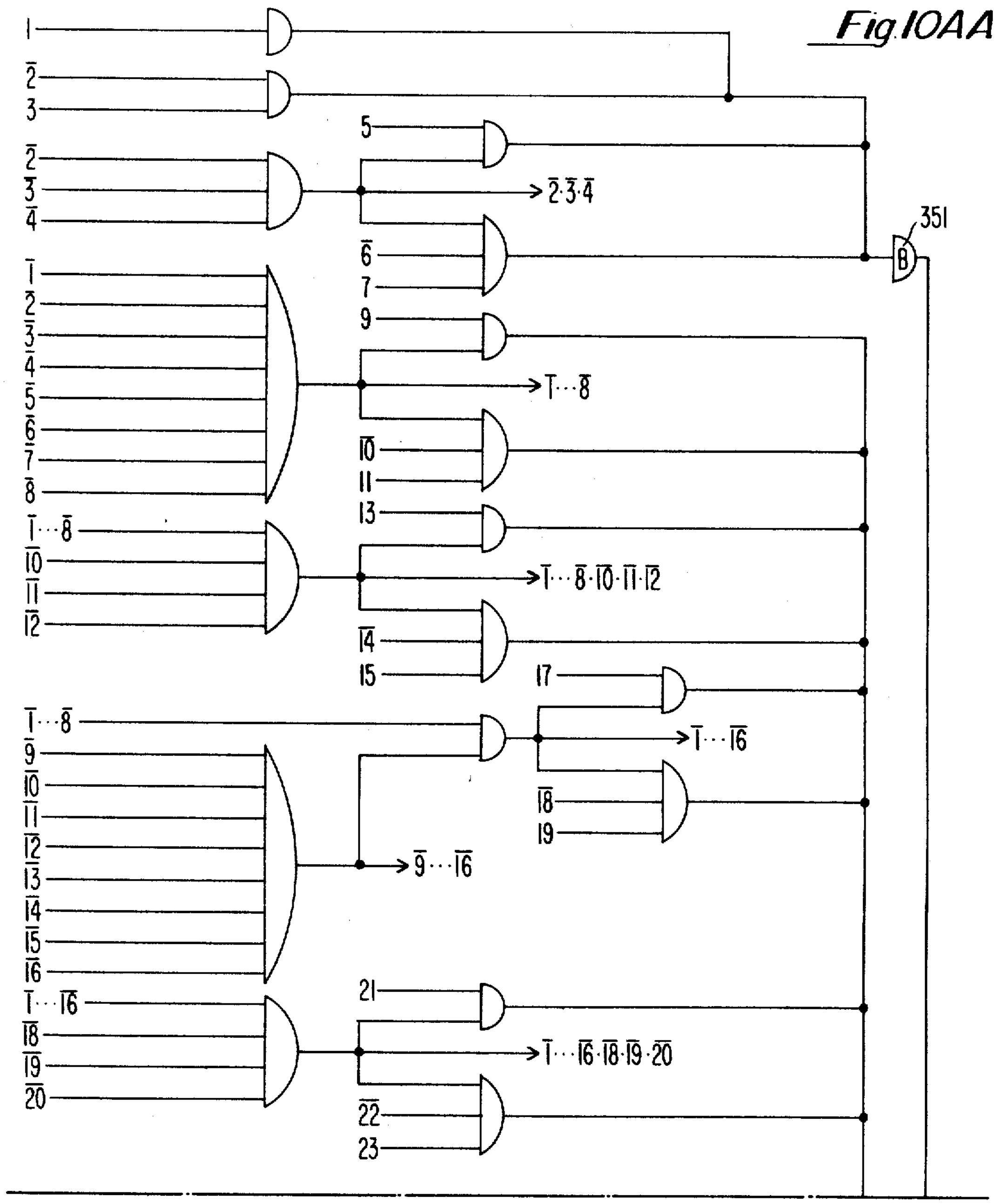
Figure 10A:
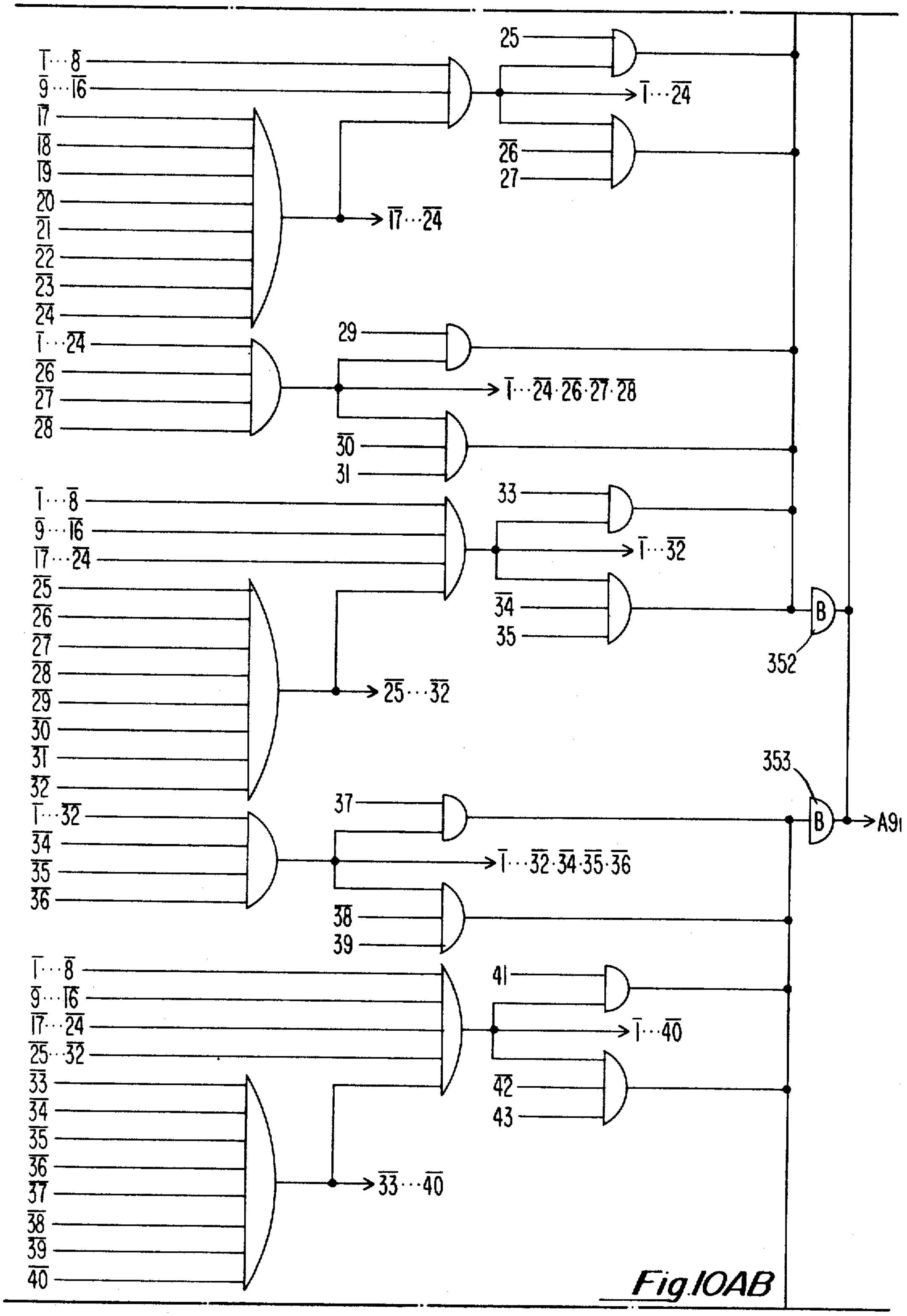
Figure 10A:
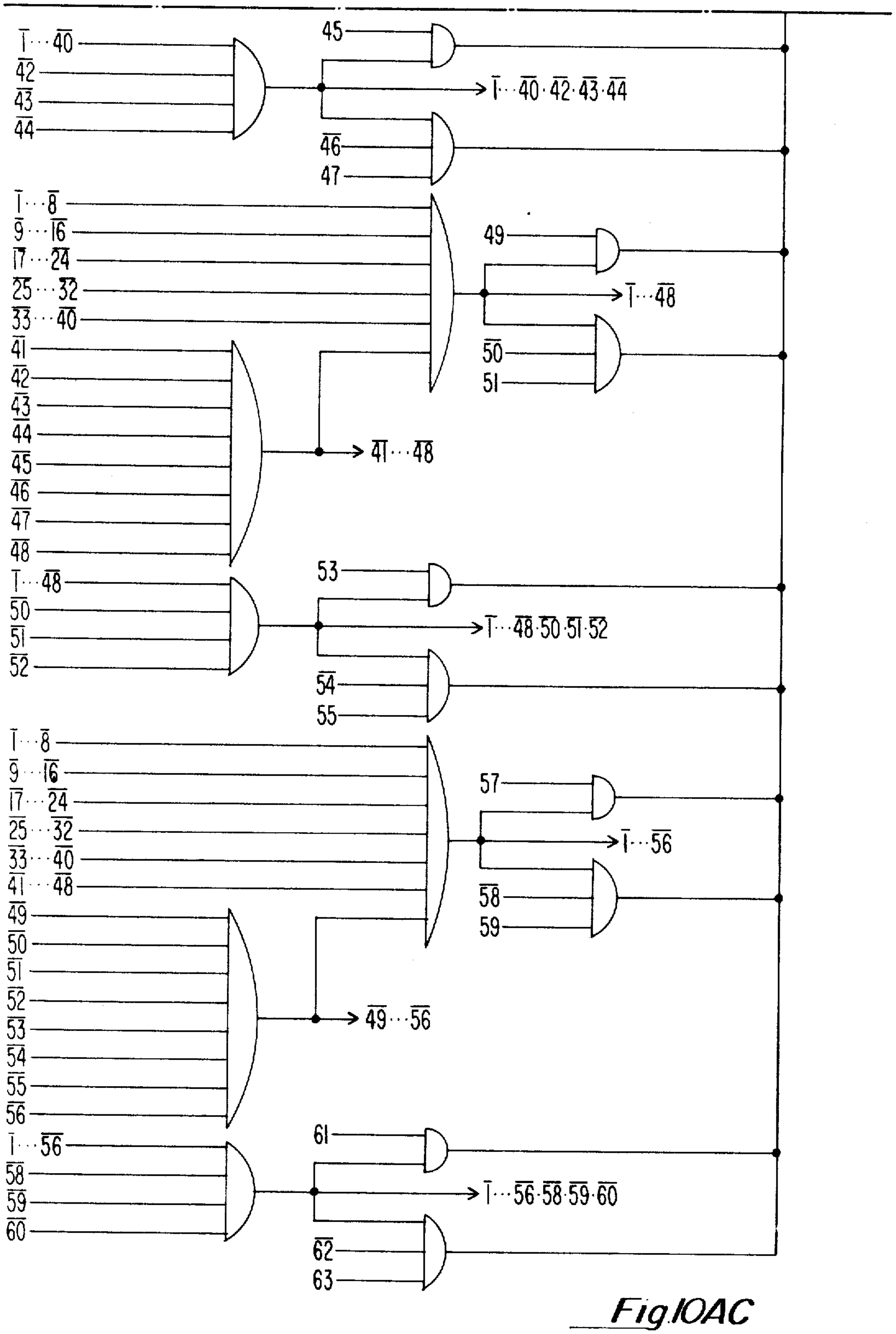
Figure 11A:
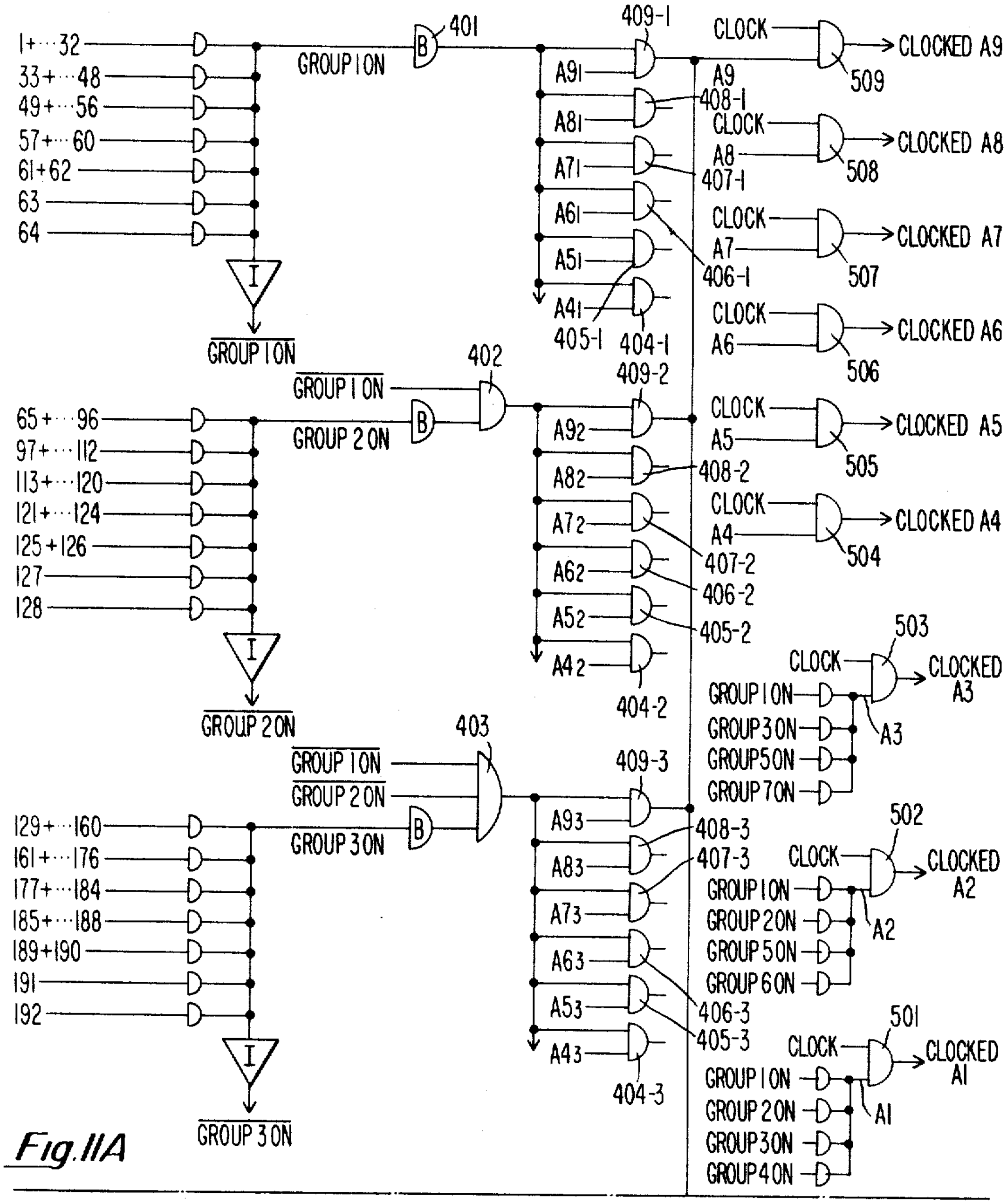
Figure 11B:
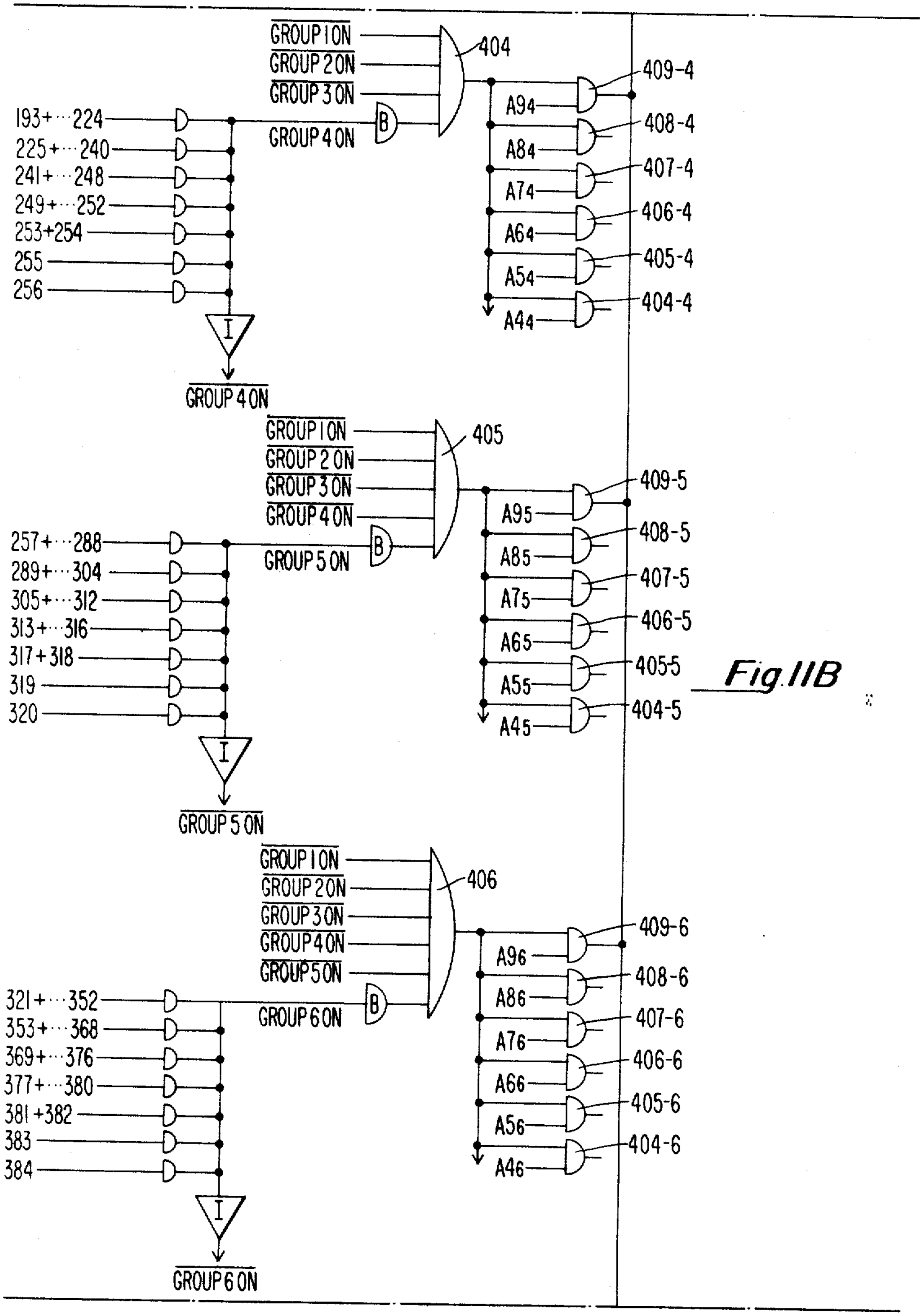

FIG. 10B shows a gating circuit comprising AND gates 360A through 360R for generating a signal A81 which is the ORed result of the outputs of buffers 361 and 362. A81 will be high for every flag having a "1" in the next to the least significant bit position of the equivalent binary number. FIG. 10C shows a gating circuit for developing a signal A71 through buffer element 371 utilizing gates 370A through H. A71 will be high for any flag whose binary equivalent number has a "1" in the third least significant bit position. FIG. 10D shows a gating circuit utilizing gates 380A through D for developing a signal A61 through buffer element 381. A61 will be high for any flags having a "1" in the fourth least significant bit position. FIG. 10E shows a gating circuit having gates 391 and 392 for producing a signal A51 which will be high for the first 16 and third 16 flip-flops of each group of 64 flags. FIG. 10F illustrates that a signal A41, produced through buffer element 396, will be high for the first 32 flip-flops in each group of 64. As in the development of A91 in FIG. 10A, there will be eight sets of gates similar to FIGS. 10B through 10F for developing corresponding signals for each of the eight groups of 64 flags, which would be present in a total of 512 flags.

FIG. 11 which consists of FIGS. 11A through C illustrates gating means for developing a signal corresponding to the particular group of 64 in which a flag appears. These group signals are ANDed with the corresponding A9, A8, A7, A6, A5, and A4 signals and then clocked to produce clocked A9, A8, A7, A6, A5, and A4 signals which are the six least significant bit positions of the binary address code for the flag to be recognized. The group signals are further selectively ORed together and clocked in gates 503, 502 and 501 to produce clocked A3, A2 and A1 signals which are construed as the three most significant bit positions of the address of the program flag given priority recognition by the priority resolver and address encoder.

FIG. 12 shows a modular data processing system in which the input-output data service computer of this invention is shown connected as in input-output control module. Such a system incorporates a central exchange to which are connected central processor modules CP1 to CP3 and memory modules MM1 to MM16. Several of the input-output data service computers of the subject invention may be incorporated into the system, being identified in FIG. 12 as IOM1, IOM2 and IOM3. The input-output computer modules are shown connected to the peripheral device controllers by an input-output exchange which connects to, for example, disc file controllers, card reader controllers, magnetic tape controllers and teletype controllers. Further information on a disc file controller including a queuer which may be utilized in combination with the data service computer of this invention may be had by reference to U.S. patent application Ser. No. 509,925, filed on Nov. 26, 1965, by James R. Bennett, William W. Parker, and Eugene Schackner.

FIG. 13 shows the interconnections provided between the input-output data service computer and other components when utilized in a modular data processing system as in FIG. 12. In FIG. 13 the input-output data service computer of the subject invention is identified as IOM and incorporates a number of sets of drivers and receivers for communicating with one or more central processor modules CPM, memory modules MM, a simplex input device controller SIDC, and a simplex output device controller SODC. The interconnecting cables transmit the necessary signals between the input-output module and the other modules and peripheral device controllers in such a system. Cables having a circled number thereon illustrate a bus in each case which contains the circled number of connecting lines. It is important to note that for some of the modules, the input-output module contains a set of receivers for each one of that type of module, while the input-output module contains only one set of receivers for serving each of certain other modules of the same type through the cable bus.

Although there has been shown and described only certain specific computer operations and inter-connections, it will be apparent that many more operations and interconnections are possible without departing from the spirit of the present invention. Therefore this invention is not to be limited except insofar as is indicated by the purview of the disclosure itself.

It should be noted that a link instruction may be placed in a channel parameter area in main memory for directing the input-output processor to switch from processing a program on one I/O channel and begin executing that program on another channel in accordance with a set of parameters unique thereto. Execution of such link instructions enables this data service computer to perform a series of transfer jobs with similar devices without having to seek a new job state word for each transfer. Further, to be noted is that the I/O processor may be instructed to process information directly from main memory without processing a channel state word or directing any peripheral device transfers. This input-output computer may therefore, process data directly from main memory in parallel with the system central processor, if desired.

*Description of the input-out data service computer operation*

The input-output data service computer relentlessly looks for work to be performed. Assuming that the I/O processor unit and the data service unit are both in their initial state, the I/O module waits for a signal from the central processor to start operations. Along with this signal and a job stack flag from the central processor, an 18 bit memory module address received by the I/O module is stored in the job stack address register JSAR, which points to the next state word in the job stack. The job stack in the main memory keeps a list of all the jobs to be executed by the I/O module in the form of state words. In response to the job stack flag the I/O processor fetches a state word from the job stack in the memory module and increments the job stack address register. The state word is stored in the state word register while the channel number is stored in the channel base address register. The instruction counter of the state word register is then set to zero so that the first program word will come from the address indicated in the instruction base address register.

The large repertoire of instructions for the I/O processing unit provides the I/O module with decision making tools. Its prime function is to assemble descriptors using a memory module address to and from where data will be transferred. The descriptor also comprises a field which defines a byte count or number of consecutive bytes to be transferred, a field which defines the byte size and byte position, and a field which defines the terminating status, and finally some control bits. The memory module address defines the start of the buffer area in the memory module where the data is temporarily stored while going to or from the disc file memory. Two such buffered areas are used by each input or output device so that while the data transfer takes place between the first buffer and the disc file memory, a second data transfer takes place between the second buffer area and the slower input or output device.

Besides the data areas, the memory module also contains the program to be exercised by an input-output channel. The buffer areas are unique to each input-output device while the program can be shared by many input-output devices similar in nature. A parameter area is also unique to each input-output device, its base address being retained in the state word register. The parameter area keeps a list of the parameters which are unique to each device. This list contains the two memory module addresses for the buffer areas, the byte count which is inserted in the descriptor for controlling the transfer of each block of data, and perhaps the table which lists the actions that have taken place from the beginning of the job to the end.

The instruction repertoire of the I/O processor unit, unlike the general purpose computer, is oriented toward the functions that the I/O module most perform. The I/O processor unit must operate on the many descriptor fields in order to form and check descriptors. The fields are defined in the instructions and the field discriminator allows addition, subtraction, comparison and other operations to be performed in the arithmetic unit.

Once the descriptor is formed, it is stored in the descriptor field of the channel controls in the local memory. Then the start line of the device whose number is contained in the channel base address register is raised. Finally the processor unit is released. The I/O processing unit is then free to determine whether a new entry exists in the job stack, and if so it will proceed to form a new descriptor from the new state word from the job stack until the list of jobs is exhausted.

Once the start line is raised, the device controller sends a service request to the data service of the I/O module informing the latter that it is ready to either send or receive a byte of data. Upon sensing the data service request from the device controller, the I/O data service unit reads the descriptor from the corresponding channel control in the local memory and allows the transfer of the byte. Then the descriptor is updated, that is, the byte count is decreased by one, and if the memory transfer took place, the memory address is also modified.

The I/O data service is designed to accept a variety of byte sizes. One byte may consist of a character of 6 bits or a character of 8 bits, or two, three, or four characters. These byte sizes are assigned to slow devices. For faster devices a byte size of one word of four words or eight words is assigned, the words consisting of 48 bits. When a byte size of less than one word is received in the data service unit, it is packed into the buffer word which is stored in local memory along with the descriptor. When this data word is full, it is then transferred to the buffer area in the memory module. For an output device which takes a byte transfer that is less than one word, then the reverse process occurs where the bytes are unpacked from the word which is fetched from the memory module and stored in the local memory temporarily.

The I/O data service unit is organized into many input and output busses. Since the data lines of many input devices are connected together, an input select strobe is sent to the input device which selects the data at the device controller and sends the information over the busses into the input register of the data service unit. This function is performed by the look-ahead address register and is controlled by the corresponding counters and controls. If the byte size is of one word or four words or eight words, it is guided directly to a storage register of the communication unit to be stored in an external memory module. The processing address register, called PA, has the function of reading the descriptor from the local memory, updating the memory address if necessary, and decrementing the byte count and updating the byte position again if necessary. In the case of an output device, the output byte is directed from the fetch register of the communication unit directly into the output register under the control of the output address register OA, and its counters and controls if the output byte was of one, four, or eight words. If the byte was less than one word, and if the data word in local memory was empty, then the word fetched at the memory address indicated in the descriptor through the communication unit is stored in local memory while the first byte is directed to the output register. This byte is defined by the byte position and byte length fields which are in the descriptor. In the case of an input byte of less than one word, the byte is inserted into the data word using the same byte length and position decoder.

Several service requests may be received by the data service unit simultaneously. However, priority will be resolved and a device which requires more frequent service will have priority over a device which requires less frequent service. This priority resolver has the function of encoding the requesting flip-flop level into a device number or channel address which is used to address the corresponding descriptor in local memory. Once a start line is raised in the controller of the device, the device then operates at its own speed in sending a service request to the I/O module when strobed and in buffering one byte of data while operating on the second byte. Between service requests of one device, the I/O data service unit responds to other service requests from other devices. The device controllers thus continue making data transfers until the descriptor is either exhausted or a terminating status has been detected. The descriptor is exhausted when the byte count reaches zero. The byte count of zero is a terminating status as well as a malfunction detected by either the device controller or the I/O data service unit. A terminating status may consist of a parity error detected in the transmission of data, a malfunction of the device itself, or a data too slow status to mention only a few of the terminating statuses.

When a terminating status is detected by the data service unit, it is then a function of the data service unit to inform the I/O processor unit of the descriptor termination. This function is performed with the use of a stack of program flags located in the local memory portion which contains the state words and the index registers. This stack consists of consecutive state word addresses into which the program flags are stored. Each program flag indicates the number of the device which requires program service. Two countable address registers control the writing and reading of device numbers whose descriptors have been exhausted. One of the address registers contains the address at which a device number or flag can be next entered and the other address register contains the address of the device number which is to be serviced next.

If the two addresses which control the stack of program flags are not equal, the I/O processing unit is informed that the local memory unit has at least one entry in the program flag stack. Every time the I/O processor is released from a program, it looks for another program flag. The function of the I/O processor unit then is to read the terminating descriptor and check to see if the descriptor was exhausted. The program is then restarted for the device if the descriptor was exhausted and a new descriptor is constructed to direct the transfer of another block of data. This process of constructing descriptors and checking them once the descriptor is exhausted, is continued by the I/O processor unit until the job is completed, using the two buffer method, so that for every block of data which is transferred from the device to the I/O or from the I/O to the device, at least two descriptors are constructed, one for the device transfer itself and another for the data transferred to or from the disc file memory.

When a job is completed, the I/O processor sends an interrupt signal to the central processor and at the same time puts a code in the interrupt stack in the memory system. This code informs the central processor either that the job was completed properly or was not completed at all. An interrupt stack address register ISAR in the I/O processing unit retains a pointer to the interrupt stack located in a memory module. This pointer is incremented every time an entry is made in the interrupt stack. Associated with the interrupt stack pointer is an interrupt stack limit register ISLR which limits the number of entries that can be made in the interrupt stack.

Other interrupt signals may be sent to the central processor such as no access to memory module or parity error detected by the communication unit on data received from the memory module. The instructions sent to the I/O processor unit are organized in one to six syllables which are packed in memory words. One syllable is the operation code, another syllable is used for an address modifier, two syllables are used for field description, and finally two other syllables are used for addressing the memory module or the local memory. These last two syllables can be relative to either the program (instruction) base address or the channel base address. The instructions vary in length from one syllable, which is the operator, to six syllables. The reason for having variable length instructions is to achieve greater program density in the memory module.

The I/O data service unit has priority over the I/O processing unit in the local memory unit. The local memory unit is designed to accept an instruction of split cycle which allows a read cycle, then a pause, then a write cycle. This pause is taken advantage of by the data service unit to update the descriptor when a byte of information is transferred. The data service unit also has priority over the processor unit in the communication unit.

The I/O communication unit consists functionally of temporary buffer areas, a communication store register and a communication fetch register along with some timing and controls, and a parity generator and parity checker. Two four-word buffer areas are used to receive multiple word bytes coming from an input device, each having an associated address. These four-word buffer registers can also be used along with a corresponding address for a one word store in a memory module. Another address register is used to hold an address for a four-word or one-word fetch from the memory modules. Along with each address is a code which informs the memory module of the type of operation to be performed such as a one-word or four-word fetch or one-word or four-word store. A fetch instruction to the communication unit has priority over a store instruction. Ranking fourth in priority of service in the communication unit is the request from the processor unit for either a fetch or a store in memory module.

Thus the I/O module is capable of operating 512 simplex devices simultaneously. These 512 simplex devices consist of 256 output and 256 input devices or 256 half-duplex devices. The byte size and rate of data transfer of each device determine its priority in the priority scheme. Buffering all incoming and outgoing data on the disc file memory, which is a high speed device, alleviates waiting periods for the central processor.

The I/O module has the capability of handling linked descriptors such that when a descriptor is exhausted in the data service unit a new descriptor is fetched from the memory module which controls the transfer of the next block of data. The option of linking descriptors is exercised by the I/O processor unit under program control when forming the original descriptor. This option is particularly useful in controlling transfer data from or to a real time device. The instruction to link another descriptor is placed in the control field of the originally constructed descriptor. The data service unit sets a program flag upon the termination of each descriptor, whether linked or not, to inform the I/O processor unit that the descriptor is exhausted. This permits the transfer of data to or from the memory buffer area just utilized while another buffer area is being filled or emptied in accordance with the linked descriptor. Furthermore, each linked descriptor can be linked to a further descriptor for unbroken service of an input or output device when necessary.

Further information regarding the incorporation and use of the subject data service computer in a modular data processing system may be had by reference to U.S. patent application Ser. No. 509,719, entitled "A Modular Multicomputing Data Processing System," filed by John T. Lynch et al., concurrently herewith.

While the preceding detailed description has been directed primarily to an illustrative embodiment of the present invention, it will be understood that the invention is not restricted thereby.

We claim:

1. A multiple channel input-output data service computer for use in a data communication system having a main memory, a plurality of input/output channels for peripheral devices and system interconnection means, said computer comprising:

a memory unit having addressable locations for storing a channel control for each input/output channel including address information of instructions and parameters stored in the system main memory and an information transfer descriptor;

input-output processing means coupled to said memory unit for responding to input/output channel program flags, comprising means for obtaining external instruction addressing information from a channel control in the local memory unit and comprising means for accessing the externally stored instructions so identified and executing the instructions obtained for deriving new information transfer descriptors; and data service means coupled to said memory unit, comprising means for transferring data to and from input/output channels and the system main memory in accordance with the channel descriptors stored in the memory unit and comprising means for raising individual channel program flags upon completion of information transfers specified by the descriptors.

2. The input-output data service computer of claim 1 wherein the data service means further comprises priority resolving and address encoding means connected to peripheral input/output devices and to peripheral device controllers for encoding the memory unit address of the channel control of the peripheral device of highest predetermined priority which is ready to perform an information transfer job.

3. The data service computer of claim 1 in which the memory unit further comprises a stack for storing program flags which identify specific input/output channels ready to receive new information transfer jobs and the input-output processing means further comprises a program flag responder for sequentially loading program flags into the memory unit stack positionally in order of priority for identifying the next input/output channel program to be processed.

4. The data service computer of claim 1 for use in a system including data buffer means coupled to said input/output channels and wherein the data service means further comprises data transfer enabling means for inserting into and selecting from said data buffer different size bytes of information for different input/output devices.

5. The invention of claim 4 in which a portion of the memory unit buffers data transfer as part of the channel controls, the descriptors of which include byte size code, byte position code, byte count, and the address of a data word storage location in the external system main memory.

6. In an electronic data processing system having a central processor, a plurality of input/output channels for peripheral devices, system interconnection means and a main memory, an input-output data service computer comprising:

local memory means for storing a channel control for each input/output channel including main memory address information of instructions and parameters and an information transfer descriptor;

processing means coupled to said local memory means and comprising means for obtaining instruction and parameter address information from a local memory channel control and means for addressing the system main memory and executing the instructions utilizing the parameters so obtained for deriving new information transfer descriptors; and data service means coupled to said local memory means, comprising means for transferring data between the main memory and said input/output channels as specified by the channel descriptors and comprising means for signalling the processing means of the completion of information transfers.

7. The combination of claim 6 wherein input/output channel program routines are located in the main memory and a system scheduling program stored in the main memory assigns those routines selectively to the input/output channels and the processing means constructs an information transfer descriptor for individual channels for storage in the local memory means, in accordance with at least one of said program routines and a set of parameters stored in the main memory for the individual channel.

8. In a system including a main memory having a stack of input/output data transfer jobs, the invention of claim 6 in which the processing means addresses said main memory stack responsive to the availability of an input/output channel to perform a new information transfer job for obtaining instruction and parameter address information relating to an information transfer job to be performed by the system and stores said information in the corresponding channel control in local memory.

9. In the system of claim 6 in combination with a disc file system connected to selected input/output channels the input/output computer comprising means to transfer data between the main memory and the disc file directly and comprising means to transfer data between peripheral devices and the disc file utilizing an area in the main memory for temporary data storage.

10. In combination with a system having a plurality of input/output channels and a main memory, a multiple channel input-output data service computer comprising:

local memory means for storing main memory address information of input/output channel programs, processing means coupled to the main memory and to the local memory means for constructing information transfer descriptors directing input/output data transfers by executing programs stored in main memory which it addresses directly upon obtaining said program address information from the local memory means for channels ready to perform a new data transfer, and data service means coupled to said input/output channels and to said main memory for performing information transfers under control of the descriptors constructed by the processing means.

11. The combination of claim 10 in which the main memory comprises a stack of input/output data transfer jobs and the processing means comprises means to address said job stack in main memory for obtaining main memory address information of input/output data transfer programs to be executed.

12. The combination of claim 10 wherein the main memory address information of input/output channel programs includes an instruction base address, an instruction count indication, and a parameter base address and the processing means comprises means for stepping said instruction count indication upon the execution of an instruction.

13. The invention of claim 12 in which certain sets of input/output program instructions stored in the main memory are applicable to directing information transfers by different ones of the input-output channels, as specified by unique sets of parameters stored in main memory for the input and output channels.

14. In an input-output programmable computer having a processing unit for constructing information transfer descriptors under program control for use in a data communication system having a main memory and a plurality of input/output channels, an input-output controller comprising local storage means for storing address information relating to programs stored in the main memory and the information transfer descriptors and comprising a data service unit coupled to said local storage means for decoding channel descriptors and transferring data between input and output devices or between an input/output device and the main memory in response to different ones of the descriptors.

15. The input-output controller of claim 14 wherein the data service unit comprises means for transferring input/output data in variable size bytes responsive to the descriptors constructed by the processing unit and includes priority resolution means for enabling information transfers by the input/output devices in accordance with a prearranged priority.

16. The invention of claim 15 wherein the program address information located in the local storage means includes an instruction base address, an instruction count indication, and a parameter base address and the descriptors include byte size code, byte position code, number of bytes to be transferred, and an external memory data buffer address.

17. Input-output data transfer processing apparatus for use in a system including a main memory, a plurality of input/output channels for peripheral devices, and system interconnection means, said apparatus comprising:

a local memory for storing input/output channel controls including main memory address information of data transfer programs and information transfer descriptors, data service means coupled to said input/output channels, to said local memory, and to said system main memory and comprising means responsive to said descriptors for transferring data between said peripheral devices and the main memory upon demand, and processing means coupled to said local memory and to said main memory and comprising means for accessing said program address information in local memory subject to priority access by the data service means and comprising means for deriving said information transfer descriptors from program instructions obtained from the main memory.

18. The input-output data transfer processing apparatus of claim 17 further comprising communications means for coupling said processing means and said data service means to the system main memory and comprising means for allowing them alternate access to the main memory, subject to priority for input data transfers from the data service means.

19. The improvement of claim 18 wherein the means for controlling access to the main memory further comprises means for allowing instruction requests from the processing means to take precedence over output data transfers to the data transfer means.

20. The input-output data transfer processing apparatus of claim 17 wherein the local memory includes storage locations for data words to be transferred by bytes of data and the data service means comprises means for transferring said data bytes through the input/output channels upon demand and according to a predetermined scheme of channel priority.

References Cited

UNITED STATES PATENTS

| | | | |
|---|---|---|---|
| 3,323,109 | 5/1967 | Hecht et al. | 340—172.5 |
| 3,053,449 | 9/1962 | Hoberg et al. | 235—157 |
| 3,014,654 | 12/1961 | Wilser et al. | 235—61.11 |
| 2,946,044 | 7/1960 | Bolgiano et al. | 340—174 |
| 2,929,556 | 3/1960 | Hawkins et al. | 235—155 |
| 2,911,624 | 11/1959 | Booth et al. | 340—174 |

PAUL J. HENON, *Primary Examiner.*

GARETH P. SHAW, *Assistant Examiner.*